US012762634B2

(12) United States Patent
Carrera Zanafria et al.

(10) Patent No.: US 12,762,634 B2
(45) Date of Patent: Oct. 13, 2026

(54) FIELD OPERATIONS FRAMEWORK

(71) Applicant: Schlumberger Technology Corporation, Sugar Land, TX (US)

(72) Inventors: Julia Marlene Carrera Zanafria, Houston, TX (US); Yeniffer Lopez Ruiz, Houston, TX (US); Ambica Agarwal, Houston, TX (US); Daniel Davalos, Houston, TX (US); Kristi Vilay, Sugar Land, TX (US); Darío de Jesus González, Quito (EC); Jean Daniel Haddad, Houston, TX (US); Akshay Hemant Dhavale, Houston, TX (US); Craig Whatley, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/045,711

(22) Filed: Feb. 5, 2025

(65) Prior Publication Data

US 2025/0252522 A1 Aug. 7, 2025

Related U.S. Application Data

(60) Provisional application No. 63/549,866, filed on Feb. 5, 2024.

(51) Int. Cl.

| | |
|---|---|
| ***G06Q 50/40*** | (2024.01) |
| ***G05B 13/02*** | (2006.01) |
| ***G05B 13/04*** | (2006.01) |
| ***G06Q 10/0631*** | (2023.01) |

(52) U.S. Cl.

CPC ......... *G06Q 50/40* (2024.01); *G05B 13/0265* (2013.01); *G05B 13/042* (2013.01); *G06Q 10/06312* (2013.01)

(58) Field of Classification Search

None

See application file for complete search history.

(56) References Cited

U.S. PATENT DOCUMENTS

2021/0341901 A1* 11/2021 Miklosovic .......... G05B 19/406
2022/0065834 A1* 3/2022 Gadot ................ G01N 33/0047
2023/0095709 A1 3/2023 Boguslawski (Continued)

FOREIGN PATENT DOCUMENTS

WO 2021126613 A1 6/2021
WO WO-2022204723 A1 * 9/2022 ............ E21B 43/00
WO 2023250338 A2 12/2023

OTHER PUBLICATIONS

Nifantov, Aleksandr, and Alexey Ruzhnikov. “Well design re-engineering: First level of emission footprint optimization.” SPE Middle East Oil and Gas Show and Conference. SPE, 2023. (Year: 2023).*

(Continued)

*Primary Examiner* — Sara Grace Brown
(74) *Attorney, Agent, or Firm* — Kyle R. Miiller

(57) ABSTRACT

A method can include receiving data from field equipment at a number of well sites via a number of local edge devices; processing the data to determine optimal field operation parameters for field operations at the number of well sites; and controlling the field operations using the determined optimal field operation parameters.

15 Claims, 23 Drawing Sheets

(56) References Cited

U.S. PATENT DOCUMENTS

| | | | | |
|---|---|---|---|---|
| 2024/0003242 | A1 | 1/2024 | Ambade | |
| 2024/0418693 | A1* | 12/2024 | Rashid | G06Q 10/04 |
| 2025/0111319 | A1* | 4/2025 | El-Khazindar | G06Q 10/0637 |
| 2025/0209305 | A1* | 6/2025 | Arukhe | F17D 3/05 |

OTHER PUBLICATIONS

Ramzey, Hazem, et al. "I2OT-EC: A framework for smart real-time monitoring and controlling crude oil production exploiting IIOT and edge computing." Energies 16.4 (2023): 2023. (Year: 2023).*

Wang, Cai, et al. "Edge optimization analytics and control: a integrated device of intelligent intermittent pumping for tight oil wells." Offshore Technology Conference Asia. OTC, 2022. (Year: 2022).*

Enemosah, Aliyu, and Joseph Chukwunweike. "Next-generation SCADA architectures for enhanced field automation and real-time remote control in oil and gas fields." Int J Comput Appl Technol Res 11.12 (2022): 514-29. (Year: 2022).*

"Corporate Value Chain (Scope 3) Accounting and Reporting Standard", Greenhouse Gas Protocol, Retrieved from the internet: https://ghgprotocol.org/sites/default/files/standards/Corporate-Value-Chain-Accounting-Reporing-Standard_041613_2.pdf, Sep. 2011, p. 31.

"Digital solutions can reduce global emissions by up to 20%. Here's how", World Economic Forum, Retrieved from the internet: https://www.weforum.org/stories/2022/05/how-digital-solutions-can-reduce-global-emissions/, May 23, 2022, pp. 1-13.

"Greenhouse Gas Protocol (GHG Protocol)", LinkedIn, Retrieved from the internet: https://www.linkedin.com/company/ghgprotocol, 2025, 13 Pages.

Alnumay, Y. et al., Carbon Footprint Reduction Through the Use of Drones for Inspection Activities, SPE-210836-MS, ADIPEC, Oct. 31, 2022, Abu Dhabi, UAE, pp. 1-11.

Greenstree K., "E P Case Study: Using Edge Computing to Reduce Truck Runs by 80%", Twin Eagle Solutions, Retrieved from the internet: https://www.hartenergy.com/ep/exclusives/ep-case-study-using-edge-computing-reduce-truck-runs-80-196363, Sep. 24, 2021, pp. 1-8.

Kadry, H. A., "Carbon Footprint Management Using Blockchain", SPE-210930-MS, ADIPEC, Oct. 31, 2022, Abu Dhabi, UAE, pp. 1-13.

Rueda, P. et al., "Smart Production Operations in a Remote Field in Latin America", SPE-216827-MS, ADIPEC, Oct. 2, 2023, Abu Dhabi, UAE, pp. 1-19.

Ruiz, Y. L. et al., "A Digital Transformation Journey for a Mature using Production Technologies and Innovation Principles", SPE-211796-MS, ADIPEC, Oct. 31, 2022, Abu Dhabi, UAE, pp. 1-9.

Ruiz, Y. L. et al., "Transforming Legacy Production Operations into Smart Asset Operations in Ecuador", SPE-211844-MS, ADIPEC, Oct. 31, 2022, Abu Dhabi, UAE, pp. 1-9.

Torre, M. et al., "Assess Digital Maturity to Set Digital Transformation Strategy in Oil and Gas", SPE-207968-MS, Abu Dhabi International Petroleum Exhibition Conference, Nov. 15, 2021, Abu Dhabi, UAE, pp. 1-16.

* cited by examiner

300

700

1000

1200

1700

| Month | Number of Remote Operations | Round Trip Saved Kilometers (Km) | Saved Liters (Diesel) | Saved Ton $CO_2$ Equivalent |
|---|---|---|---|---|

Table 1. $CO_2$ Emission Factors by Fuel

| Fuel | | Heating Value | $CO_2$ Emission Factors for Fuel Consumption Data That Have Been Supplied on Different Measurement Bases | | | | | |
|---|---|---|---|---|---|---|---|---|
| | | | Energy Basis | Mass Basis | Fuel Density Information | | Liquid Basis | Gas Basis |
| | | TJ/Gg | Kg/TJ | kg/Tonne | Of Liquids (kg/Litre Fuel) | Of Gases ($kg/m^3$ of) | kg/Litre | $kg/m^3$ |
| Oil Products | Crude Oil | 42.3 | 73300 | 3100.59 | 0.8 | | 2.480472 | |
| | Orimulsion | 27.5 | 77000 | 2117.5 | | | | |
| | Natural Gas Liquids | 44.2 | 64200 | 2837.64 | | | | |
| | Motor Gasoline | 44.3 | 69300 | 3069.99 | 0.74 | | 2.2717926 | |
| | Aviation Gasoline | 44.3 | 70000 | 3101 | 0.71 | | 2.20171 | |
| | Jet Gasoline | 44.3 | 70000 | 3101 | 0.71 | | 2.20171 | |
| | Jet Kerosene | 44.1 | 71500 | 3153.15 | 0.79 | | 2.4909885 | |
| | Other Kerosene | 43.8 | 71900 | 3149.22 | 0.8 | | 2.519376 | |
| | Shale Oil | 38.1 | 73300 | 2792.73 | 1 | | 2.79273 | |
| | Gas/Diesel Oil | 43 | 74100 | 3186.3 | 0.84 | | 2.676492 | |
| | Residual Fuel Oil | 40.4 | 77400 | 3126.96 | 0.94 | | 2.9393424 | |
| | Liquified Petroleum Gases | 47.3 | 63100 | 2984.63 | 0.54 | | 1.6117002 | |
| | Ethane | 46.4 | 61600 | 2858.24 | | 1.3 | | 3.715712 |
| | Naphtha | 44.5 | 73300 | 3261.85 | 0.77 | | 2.5116245 | |

FIG. 17A

| | | | | | | | | |
|---|---|---|---|---|---|---|---|---|
| | Bitumen | 40.2 | 80700 | 3244.14 | | | | |
| | Lubricants | 40.2 | 73300 | 2946.66 | 1 | | 2.94666 | |
| | Petroleum Coke | 32.5 | 97500 | 3168.75 | | | | |
| | Refinery Feedstocks | 43 | 73300 | 3151.9 | | | | |
| | Refinery Gas | 49.5 | 57600 | 2851.2 | | | | |
| | Paraffin Waxes | 40.2 | 73300 | 2946.66 | | | | |
| | White Spirit/SBP | 40.2 | 73300 | 2946.66 | | | | |
| | Other Petroleum Products | 40.2 | 73300 | 2946.66 | | | | |

| Remote Operation List |
| --- |
| Frequency Increase Directly |
| Frequency Increase in Ramp |
| Frequency Decrease Directly |
| Frequency Decrease in Ramp |
| Shut In |
| Start Up |
| Settings Changes |

| Client Reason |
| --- |
| Well Optimization |
| Avoid Well Shutdown |
| Programmed Riggles Well Job |
| Emerging Job |
| Safe Start Up |
| Planned Workover Job |

FIG. 17C

FIELD OPERATIONS FRAMEWORK

RELATED APPLICATIONS

This application claims priority to and the benefit of a U.S. Provisional Application having Ser. No. 63/549,866, filed 5 Feb. 2024, which is incorporated by reference herein in its entirety.

BACKGROUND

Various types of fluids may be stored in a subsurface region. For example, consider storage of hydrogen in a subsurface region, storage of carbon in a subsurface region, etc. Various field operations may include injection of fluid into a subsurface region and/or production of fluid from a subsurface region. Various technologies, techniques, etc., described herein pertain to operations that may involve storage of fluid, injection of fluid and/or production of fluid.

SUMMARY

A method can include receiving data from field equipment at a number of well sites via a number of local edge devices; processing the data to determine optimal field operation parameters for field operations at the number of well sites; and controlling the field operations using the determined optimal field operation parameters. A system can include a processor; a memory operatively coupled to the processor; processor-executable instructions stored in the memory and executable to instruct the system to: receive data from field equipment at a number of well sites via a number of local edge devices; process the data to determine optimal field operation parameters for field operations at the number of well sites; and control the field operations using the determined optimal field operation parameters. One or more computer-readable storage media can include processor-executable instructions executable by a system to instruct the system to: receive data from field equipment at a number of well sites via a number of local edge devices; process the data to determine optimal field operation parameters for field operations at the number of well sites; and control the field operations using the determined optimal field operation parameters. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 17A, FIG. 17B, and FIG. 17C illustrate examples of graphics;

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Below, various types of environments, frameworks, workflows, data acquisition techniques, field equipment, field operations, etc., are described, which may involve use of a framework or frameworks, optionally during one or more field operations.

Figure 1:
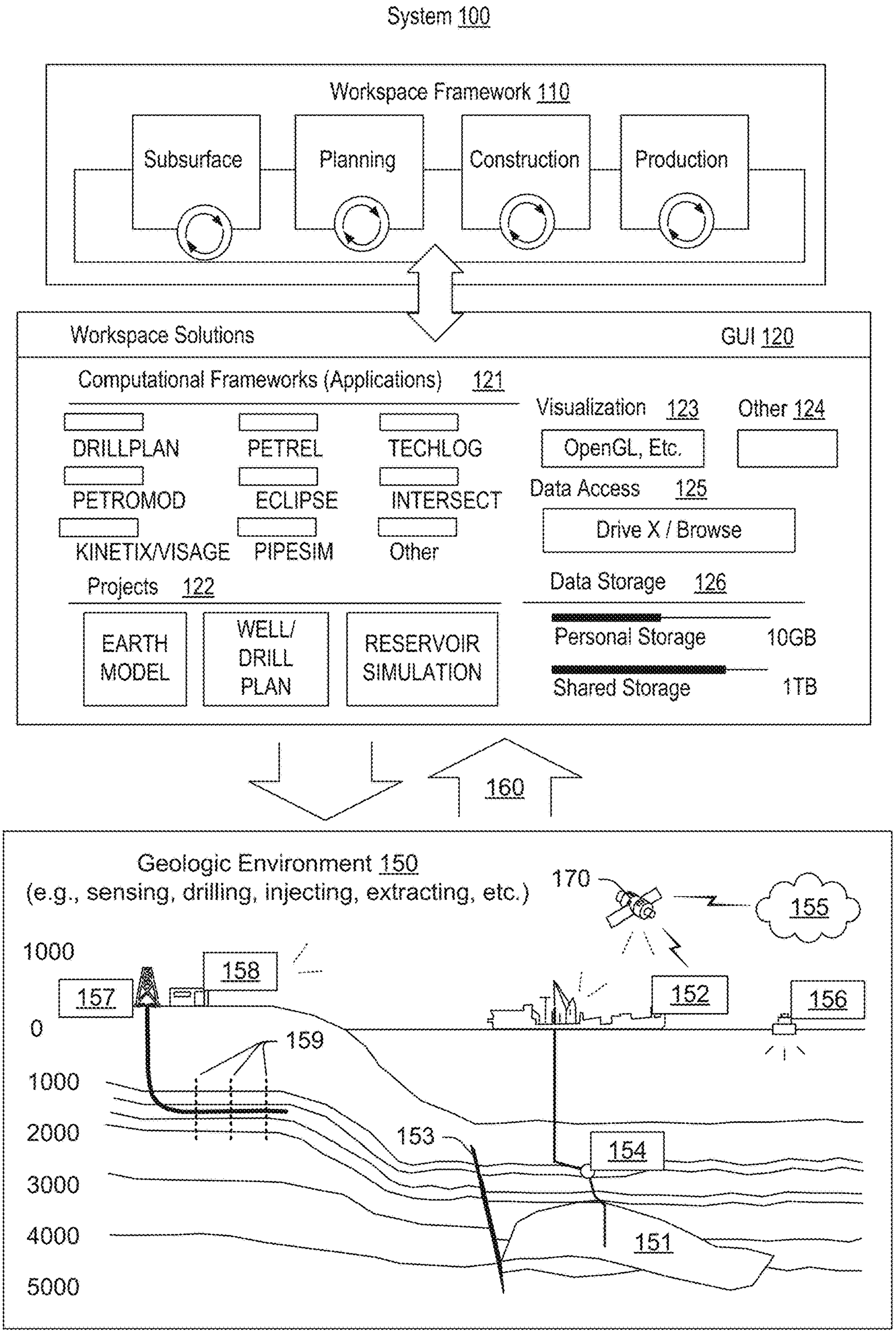
FIG. 1 illustrates an example system that includes various components for simulating a geological environment.

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. A geologic environment 150 may be outfitted with a variety of sensors, detectors, actuators, etc. In such an environment, various types of equipment such as, for example, equipment 152 may include communication circuitry to receive and to transmit information, optionally with respect to one or more networks 155. Such information may include information associated with downhole equipment 154, which may be equipment to acquire information, to assist with resource recovery, etc. Other equipment 156 may be located remote from a well site and include sensing, detecting, emitting, or other circuitry. Such equipment may include storage and communication circuitry to store and to communicate data, instructions, etc. One or more satellites may be provided for purposes of communications, data acquisition, etc. For example, FIG. 1 shows a satellite 170 in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc., may exist where an assessment of such variations may assist with planning, operations, etc., to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, PETREL, TECHLOG, PETROMOD, ECLIPSE, INTERSECT, KINETIX/VISAGE, and PIPESIM frameworks (SLB, Houston, Texas). One or more types of frameworks may be implemented within or in a manner operatively coupled to the DELFI environment, which is a secure, cognitive, cloud-based collaborative environment that integrates data and workflows with digital technologies, such as artificial intelligence (AI) and machine learning (ML). Such an environment can provide for operations that involve one or more frameworks. The DELFI environment may be referred to as the DELFI framework, which may be a framework of frameworks. The DELFI environment can include various other frameworks, which may operate using one or more types of models (e.g., simulation models, etc.).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The DRILLOPS framework, which may be included in the system 100 of FIG. 1, may execute a digital drilling plan and ensures plan adherence, while delivering goal-based automation. The DRILLOPS framework may generate activity plans automatically for individual operations, whether they are monitored and/or controlled on the rig or in town. Automation may utilize data analysis and learning systems to assist and optimize tasks, such as, for example, setting ROP to drilling a stand. A preset menu of automatable drilling tasks may be rendered, and, using data analysis and models, a plan may be executed in a manner to achieve a specified goal, where, for example, measurements may be utilized for calibration. The DRILLOPS framework provides flexibility to modify and replan activities dynamically, for example, based on a live appraisal of various factors (e.g., equipment, personnel, and supplies). Well construction activities (e.g., tripping, drilling, cementing, etc.) may be continually monitored and dynamically updated using feedback from operational activities. The DRILLOPS framework may provide for various levels of automation based on planning and/or re-planning (e.g., via the DRILLPLAN framework), feedback, etc.

The PETREL framework can be part of the DELFI cognitive exploration and production (E&P) environment (SLB, Houston, Texas, referred to as the DELFI environment) for utilization in geosciences and geoengineering, for example, to analyze subsurface data from exploration to production of fluid from a reservoir.

The TECHLOG framework can handle and process field and laboratory data for a variety of geologic environments (e.g., deepwater exploration, shale, etc.). The TECHLOG framework can structure wellbore data for analyses, planning, etc. As an example, the TECHLOG framework may be coupled to one or more ML models for purposes of generation of output, training, etc.

The PETROMOD framework provides petroleum systems modeling capabilities that can combine one or more of seismic, well, and geological information to model the evolution of a sedimentary basin. The PETROMOD framework can predict if, and how, a reservoir has been charged with hydrocarbons, including the source and timing of hydrocarbon generation, migration routes, quantities, and hydrocarbon type in the subsurface or at surface conditions.

The ECLIPSE framework provides a reservoir simulator with numerical solvers for prediction of dynamic behavior for various types of reservoirs and development schemes.

The INTERSECT framework provides a high-resolution reservoir simulator for simulation of geological features and quantification of uncertainties, for example, by creating production scenarios and, with the integration of precise models of the surface facilities and field operations, the INTERSECT framework can produce results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed chemical-enhanced-oil-recovery (EOR) formulations where such formulations can be implemented in the field, can analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI environment, for example, for rapid simulation of multiple concurrent cases.

The KINETIX framework provides for reservoir-centric stimulation-to-production analyses that can integrate geology, petrophysics, completion engineering, reservoir engineering, and geomechanics, for example, to provide for optimized completion and fracturing designs for a well, a pad, or a field. The KINETIX framework can be operatively coupled to and/or integrated with features of the PETREL framework (e.g., within the DELFI environment). As to the VISAGE framework it can be part of or otherwise operatively coupled to the KINETIX framework.

The VISAGE framework includes finite element numerical solvers that may provide simulation results such as, for example, results as to compaction and subsidence of a geologic environment, well and completion integrity in a geologic environment, cap-rock and fault-seal integrity in a geologic environment, fracture behavior in a geologic environment, thermal recovery in a geologic environment, $CO2$ disposal, etc.

As an example, the KINETIX framework can provide for analyses from 1D logs and simple geometric completions to 3D mechanical and petrophysical models coupled with the INTERSECT framework high-resolution reservoir simulator and VISAGE framework finite-element geomechanics simulator. The KINETIX framework can provide automated parallel processing using cloud platform resources and can provide for rapid assessment of well spacing, completion, and treatment design choices, enabling exploration of many scenarios in a relatively rapid manner (e.g., via provisioning of cloud platform resources).

The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (SLB, Houston, Texas). The PIPESIM simulator may be an optimizer that can optimize one or more operational scenarios at least in part via simulation of physical phenomena.

As an example, a system may include or be operatively coupled to the SYMMETRY framework (SLB, Houston, Texas). The SYMMETRY framework provides features to model process workflows integrating facilities, process units with pipelines, fluid networks, flares, and safety systems, while ensuring consistent thermodynamics and fluid characterization across a system. Such an approach provides for optimizing processes in upstream, midstream and downstream sectors, which may be utilized for maximizing return, minimizing CAPEX, assessing emissions, assessing resource inputs, etc.

The aforementioned DELFI environment provides various features for workflows as to subsurface analysis, planning, construction and production, for example, as illustrated in the workspace framework 110. As shown in FIG. 1, outputs from the workspace framework 110 can be utilized for directing, controlling, etc., one or more processes in the geologic environment 150, and feedback 160 can be received via one or more interfaces in one or more forms (e.g., acquired data as to operational conditions, equipment conditions, environment conditions, etc.).

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

Visualization features may provide for visualization of various earth models, properties, etc., in one or more dimensions. As an example, visualization features may include one or more control features for control of equipment, which can include, for example, field equipment that can perform one or more field operations. A workflow may utilize one or more frameworks to generate information that can be utilized to control one or more types of field equipment (e.g., drilling equipment, wireline equipment, fracturing equipment, etc.).

Figure 2:
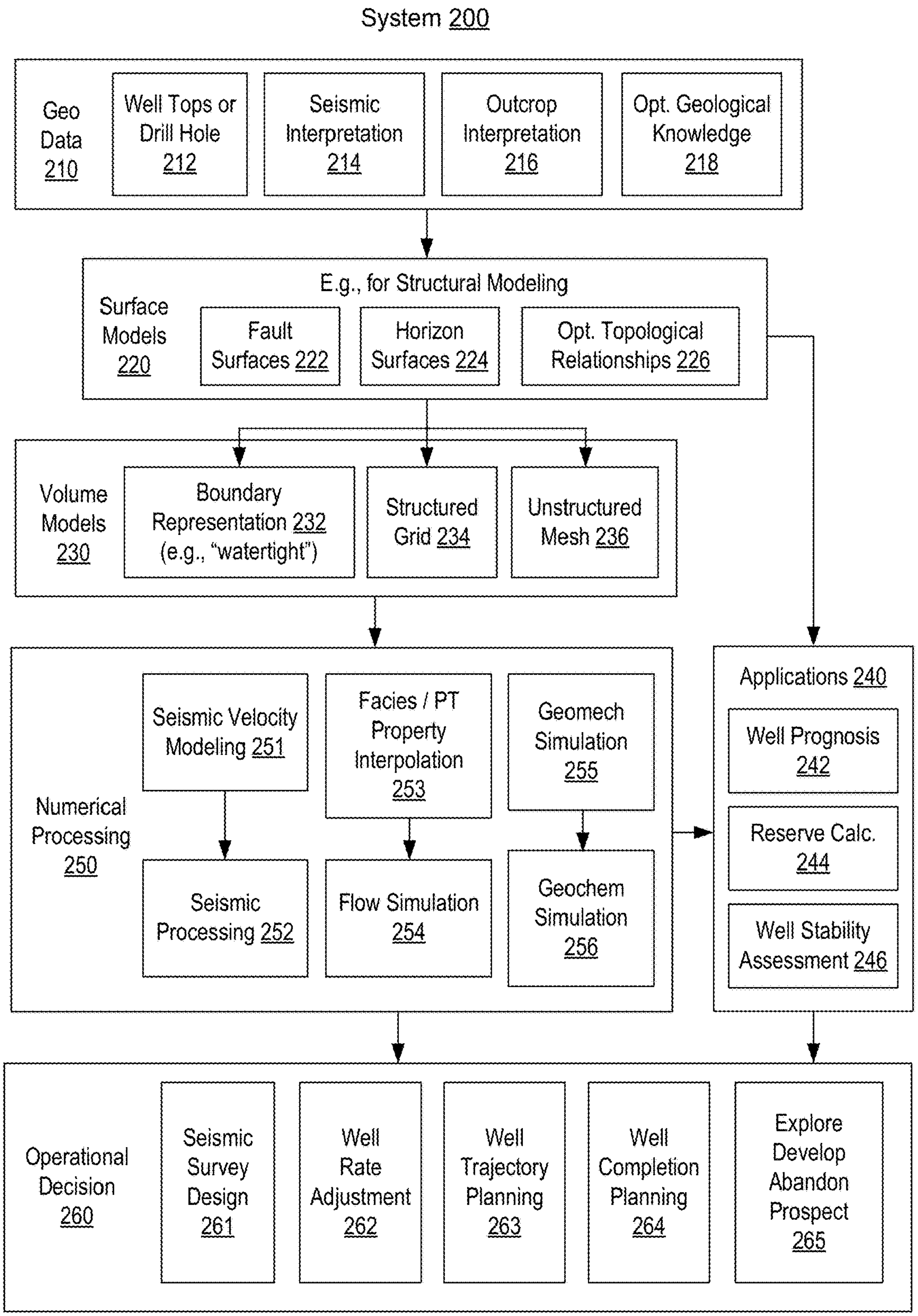
FIG. 2 illustrates an example of a system.

FIG. 2 shows an example of a system 200 that can be operatively coupled to one or more databases, data streams, etc. For example, one or more pieces of field equipment, laboratory equipment, computing equipment (e.g., local and/or remote), etc., can provide and/or generate data that may be utilized in the system 200.

As shown, the system 200 can include a geological/geophysical data block 210, a surface models block 220 (e.g., for one or more structural models), a volume modules block 230, an applications block 240, a numerical processing block 250 and an operational decision block 260. As shown in the example of FIG. 2, the geological/geophysical data block 210 can include data from well tops or drill holes 212, data from seismic interpretation 214, data from outcrop interpretation and optionally data from geological knowledge. As an example, the geological/geophysical data block 210 can include data from digital images, which can include digital images of cores, cuttings, cavings, outcrops, etc. As to the surface models block 220, it may provide for creation, editing, etc. of one or more surface models based on, for example, one or more of fault surfaces 222, horizon surfaces 224 and optionally topological relationships 226. As to the volume models block 230, it may provide for creation, editing, etc. of one or more volume models based on, for example, one or more of boundary representations 232 (e.g., to form a watertight model), structured grids 234 and unstructured meshes 236.

As shown in the example of FIG. 2, the system 200 may allow for implementing one or more workflows, for example, where data of the data block 210 are used to create, edit, etc. one or more surface models of the surface models block 220, which may be used to create, edit, etc. one or more volume models of the volume models block 230. As indicated in the example of FIG. 2, the surface models block 220 may provide one or more structural models, which may be input to the applications block 240. For example, such a structural model may be provided to one or more applications, optionally without performing one or more processes of the volume models block 230 (e.g., for purposes of numerical processing by the numerical processing block 250). Accordingly, the system 200 may be suitable for one or more workflows for structural modeling (e.g., optionally without performing numerical processing per the numerical processing block 250).

As to the applications block 240, it may include applications such as a well prognosis application 242, a reserve calculation application 244 and a well stability assessment application 246. As to the numerical processing block 250, it may include a process for seismic velocity modeling 251 followed by seismic processing 252, a process for facies and petrophysical property interpolation 253 followed by flow simulation 254, and a process for geomechanical simulation 255 followed by geochemical simulation 256. As indicated, as an example, a workflow may proceed from the volume models block 230 to the numerical processing block 250 and then to the applications block 240 and/or to the operational decision block 260. As another example, a workflow may proceed from the surface models block 220 to the applications block 240 and then to the operational decisions block 260 (e.g., consider an application that operates using a structural model).

In the example of FIG. 2, the operational decisions block 260 may include a seismic survey design process 261, a well rate adjustment process 262, a well trajectory planning process 263, a well completion planning process 264 and a process for one or more prospects, for example, to decide whether to explore, develop, abandon, etc. a prospect.

Referring again to the data block 210, the well tops or drill hole data 212 may include spatial localization, and optionally surface dip, of an interface between two geological formations or of a subsurface discontinuity such as a geological fault; the seismic interpretation data 214 may include a set of points, lines or surface patches interpreted from seismic reflection data, and representing interfaces between media (e.g., geological formations in which seismic wave velocity differs) or subsurface discontinuities; the outcrop interpretation data 216 may include a set of lines or points, optionally associated with measured dip, representing boundaries between geological formations or geological faults, as interpreted on the earth surface; and the geological knowledge data 218 may include, for example knowledge of the paleo-tectonic and sedimentary evolution of a region.

As to a structural model, it may be, for example, a set of gridded or meshed surfaces representing one or more interfaces between geological formations (e.g., horizon surfaces) or mechanical discontinuities (fault surfaces) in the subsurface. As an example, a structural model may include some information about one or more topological relationships between surfaces (e.g., fault A truncates fault B, fault B intersects fault C, etc.).

As to the one or more boundary representations 232, they may include a numerical representation in which a subsurface model is partitioned into various closed units representing geological layers and fault blocks where an individual unit may be defined by its boundary and, optionally, by a set of internal boundaries such as fault surfaces.

As to the one or more structured grids 234, it may include a grid that partitions a volume of interest into different elementary volumes (cells), for example, that may be indexed according to a pre-defined, repeating pattern. As to the one or more unstructured meshes 236, it may include a mesh that partitions a volume of interest into different elementary volumes, for example, that may not be readily indexed following a pre-defined, repeating pattern (e.g., consider a Cartesian cube with indexes I, J, and K, along x, y, and z axes).

As to the seismic velocity modeling 251, it may include calculation of velocity of propagation of seismic waves (e.g., where seismic velocity depends on type of seismic wave and on direction of propagation of the wave). As to the seismic processing 252, it may include a set of processes allowing identification of localization of seismic reflectors in space, physical characteristics of the rocks in between these reflectors, etc.

As to the facies and petrophysical property interpolation 253, it may include an assessment of type of rocks and of their petrophysical properties (e.g., porosity, permeability), for example, optionally in areas not sampled by well logs or coring. As an example, such an interpolation may be constrained by interpretations from log and core data, and by prior geological knowledge.

As to the flow simulation 254, as an example, it may include simulation of flow of hydro-carbons in the subsurface, for example, through geological times (e.g., in the context of petroleum systems modeling, when trying to predict the presence and quality of oil in an un-drilled formation) or during the exploitation of a hydrocarbon reservoir (e.g., when some fluids are pumped from or into the reservoir).

As to geomechanical simulation 255, it may include simulation of the deformation of rocks under boundary conditions. Such a simulation may be used, for example, to assess compaction of a reservoir (e.g., associated with its depletion, when hydrocarbons are pumped from the porous and deformable rock that composes the reservoir). As an example, a geomechanical simulation may be used for a variety of purposes such as, for example, prediction of fracturing, reconstruction of the paleo-geometries of the reservoir as they were prior to tectonic deformations, etc.

As to geochemical simulation 256, such a simulation may simulate evolution of hydrocarbon formation and composition through geological history (e.g., to assess the likelihood of oil accumulation in a particular subterranean formation while exploring new prospects).

As to the various applications of the applications block 240, the well prognosis application 242 may include predicting type and characteristics of geological formations that may be encountered by a drill bit, and location where such rocks may be encountered (e.g., before a well is drilled); the reserve calculations application 244 may include assessing total amount of hydrocarbons or ore material present in a subsurface environment (e.g., and estimates of which proportion can be recovered, given a set of economic and technical constraints); and the well stability assessment application 246 may include estimating risk that a well, already drilled or to-be-drilled, will collapse or be damaged due underground stress.

As to the operational decision block 260, the seismic survey design process 261 may include deciding where to place seismic sources and receivers to optimize the coverage and quality of the collected seismic information while minimizing cost of acquisition; the well rate adjustment process 262 may include controlling injection and production well schedules and rates (e.g., to maximize recovery and production); the well trajectory planning process 263 may include designing a well trajectory to maximize potential recovery and production while minimizing drilling risks and costs; the well completion planning process 264 may include selecting proper well tubing, casing and completion (e.g., to meet expected production or injection targets in specified reservoir formations); and the prospect process 265 may include decision making, in an exploration context, to continue exploring, start producing or abandon prospects (e.g., based on an integrated assessment of technical and financial risks against expected benefits).

The system 200 can include and/or can be operatively coupled to a system such as the system 100 of FIG. 1. For example, the workspace framework 110 may provide for instantiation of, rendering of, interactions with, etc., the graphical user interface (GUI) 120 to perform one or more actions as to the system 200. In such an example, access may be provided to one or more frameworks (e.g., DRILLPLAN, DRILLOPS, PETREL, TECHLOG, PETROMOD, ECLIPSE, INTERSECT, KINETIX/VISAGE, PIPESIM, SYMMETRY, etc.). One or more frameworks may provide for geo data acquisition as in block 210, for structural modeling as in block 220, for volume modeling as in block 230, for running an application as in block 240, for numerical processing as in block 250, for operational decision making as in block 260, etc.

As an example, the system 200 may provide for monitoring data, which can include geo data per the geo data block 210. In various examples, geo data may be acquired during one or more operations. For example, consider acquiring geo data during drilling operations via downhole equipment and/or surface equipment. As an example, the operational decision block 260 can include capabilities for monitoring, analyzing, etc., such data for purposes of making one or more operational decisions, which may include controlling equipment, revising operations, revising a plan, etc. In such an example, data may be fed into the system 200 at one or more points where the quality of the data may be of particular interest. For example, data quality may be characterized by one or more metrics where data quality may provide indications as to trust, probabilities, etc., which may be germane to operational decision making and/or other decision making.

As an example, the system 200 may include one or more features for operations involving storage of fluid in a subsurface region and/or production of fluid from a subsurface region. For example, consider operations that may involve fluid that may include one or more of hydrogen, carbon, oxygen, sulfur, etc. As an example, the system 200 may include one or more ML models, for example, consider one or more ML models for use in one or more types of workflows. As an example, the system 200 may include one or more hybrid models, which may include one or more physics-based portion and one or more data-based portions. As an example, the system 200 may include one or more physics-informed ML models and/or implementation of one or more physics-informed ML techniques.

As an example, a workflow may provide for transforming legacy production operations into smart asset operations. In such an example, one or more frameworks may be implemented that may facilitate planning, execution, operation, control, etc., of field operations.

An article by Lopez Ruiz et al., "A Digital Transformation Journey for a Mature using Production Technologies and Innovation Principles," paper presented at the ADIPEC, Abu Dhabi, UAE, October 2022 (doi: https://doi.org/10.2118/211796-MS) is incorporated by reference herein in its entirety, which describes connecting production chain elements to one unique gateway and edge platform where data were consolidated to perform asset surveillance, monitoring, and controlling of electrical submersible pump (ESP) parameters along with creation of an autonomous system aiming to avoid gas blockage on ESPs and deployment of a production engineering orchestrator for easing collaborative, day-to-day analysis for production, operations, and exploitation engineers. An article by Lopez Ruiz et al., "Transforming Legacy Production Operations into Smart Asset Operations in Ecuador," paper presented at the ADIPEC, Abu Dhabi, UAE, October 2022 (doi: https://doi.org/10.2118/211844-MS) is incorporated by reference herein in its entirety, which describes 12 gas handling equipment systems operating in a field, resulting in a 12 percent increase in production where chemical injection accuracy increased up to 99 percent and corrosion/fouling failures reduced by 50 percent, where field operations involved various aspects of flare monitoring and gas volume measurements, virtual flow meter, smart alarms, surveillance of portable multiphase flow meters (Vx Units), pumping equipment of high pressure (HPS), and monitoring and diagnosis of vibrations in rotating equipment.

Fields exist in various locations around the world. For example, consider fields in Ecuador where, for more than 30 years, most of the fields have reached a high level of maturity that demands several operational and control challenges for multiple processes such as chemical injection, high gas volumes, water cut incremental among many other issues affecting the useful life of downhole equipment installed in the well or devices located on the surface. Implementing digital solutions in a field may face challenge of allocating faster and agile solutions that add efficiency to production while minimizing deferred production for implementation. As an example, IoT and edge computing along with cloud platform technologies may be implemented for field operations that may include control of field operations. Various controls may provide an easier, faster, and more reliable way of guaranteeing production integrity operations, while reducing carbon footprint and, for example, improving work-life balance.

As an example, a framework may provide for improvement of production engineering analysis and production operations in the field, which may involve asset surveillance. Various activities demand time-consuming tasks such as field trips and well-by-well analysis. As an example, a framework may provide for leveraging use of data, promoting remote operations, and automating workflows such as one or more types of workflows that may be used within a production engineering department.

As time goes by and oil and/or gas fields mature, operations tend to be presented, day-by-day, with new challenges. Such challenges demand attention and may benefit from optimization of processes, safely and efficiently. Various challenges may be directly identified using characteristics of wells, fields and reservoirs, some of which may include one or more of depth, temperature, reservoir pressures, solids production, requirement and maintenance times of equipment and facilities, among others. Adoption of digital technologies may provide an ability to address various challenges more quickly and safely by adopting prototypes that may be later easily scaled and that allow for reduction in risks of premature failures while, for example, increasing useful life of equipment, optimizing production, reducing intervention costs, and adding positive value to sustainability and carbon footprint reduction.

Various technologies may be implemented in an effort to improve current processes, where adoption may be focused primarily on increasing production safely. Additionally, technologies may be implemented for reducing operating costs, exposure of personnel in the field, integrity of facilities, and the impact on carbon footprint. Each aspect may play a particular role in achieving a transformation and implementation of new processes that intelligently generate autonomy in the field and reduce disconnection that may exist when it comes to collecting and processing data that flows from its origin to one or more centers that may be remote from a field site for purposes of processing (e.g., for decision making, etc.). Intelligence and autonomy of production operations may be achieved by integration of data flow from sensors of equipment in an edge computing environment where, for example, various algorithms, artificial intelligence and machine learning processes may be fed to optimize specific processes, minimizing manual intervention and maximizing production at lower cost.

Various examples may be described for one or more fields where, for example, a mature field located in the Oriente Basin (Ecuador) may be considered for purposes of explanation. As an example, field operations may be facilitated using a framework that provides for scalable, intelligent, and autonomous digital monitoring and/or control.

As mentioned, various types of networked devices may be utilized at a field site. As an example, a network or networks at a field site may be operatively coupled to the Internet and/or one or more other networks in a continuous or intermittent manner or, for example, a network at a field site may be isolated and, for example, updatable locally (e.g., consider local installation of instructions via one or more media, etc.). A network may include visible and/or interactive devices, which may include sensors, mechanical devices, mobile devices, appliances, clothing (e.g., including safety gear, etc.), etc. As an example, networked devices may provide for machine-to-machine interaction (M2M interaction) using machine-to-machine devices (M2M devices).

Edge computing may involve one or more edge devices located at a physical location, which may be at or near a data source, which may provide for reduced latency and/or higher bandwidth availability. As explained, a cloud platform or cloud platforms may be utilized where various services and computing resources may reside in one or more data centers (e.g., server farms, etc.) as may be accessed via a network by an edge device at the edge of the network. In various instances, field operations may benefit from computing power being closer to where a physical device or data source is located, which may be at an edge of a network. By being closer to such locations, access may be faster and services more reliable. As an example, one or more applications may be supported at an edge, for example, using one or more edge frameworks. As an example, one or more machine learning (ML) and/or artificial intelligence (AI) techniques may be implemented locally and/or remotely. As to local implementation, consider a lightweight approach to ML model execution by an edge device and/or, for example, utilization of one or more application programming interfaces (APIs) that may reduce bandwidth demands for interaction with one or more remote ML models (e.g., cloud platform hosted, etc.). As an example, equipment topography may provide for improved data processing and application support, for example, to respond quickly to specific events, for AI/ML implementation and analysis, trend identification, etc.

Figure 3:
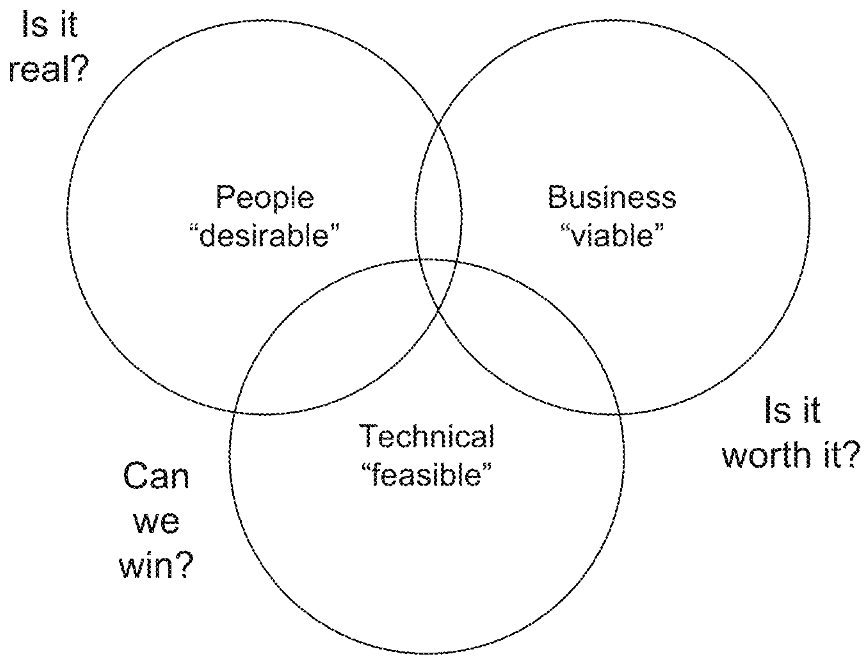
FIG. 3 illustrates an example of a graphic.

FIG. 3 shows an example of a process 300 referred to as Real, Win and Worth (RWW), which may be utilized to improve field operations. In such an approach, "real" refers to a product or solution being created to solve a real demand such as, for example, addressing silos or disconnection that may exist when collecting and processing data that flows from bottom and surface elements that make up the production chain to remote monitoring and surveillance centers that may provide for decision making and/or control. As to "win", it pertains to feasibility, for example, an ability to address the real demand by providing connectivity, data delivery, monitoring, control, and edge intelligence for various elements of a production chain (e.g., consider one or more of artificial lift equipment (electro-submersible and mechanical pumps), multiphase meters, level meters, gas flares or burners, injection equipment and pumps and other elements installed in the field). As an example, elements may be connected through a standardized, secure and scalable platform. As an example, consider a proof of value (POV) for 10 wells with electric submersible pumping equipment drives of different brands, which creates a connection and communication dilemma between them, whereby standardization may provide for enhanced protocols as to data, analysis, monitoring and/or control. As to "worth", it may represent economic viability with tangible benefits, which may be generally aligned to performance indicators. For instance, increased production, reduced production losses, increased staff productivity, decreased carbon footprint and exposure to risk by field staff, reduced operating costs, as well as having a secure data integrity process, and other factors that may prevent the premature failure of equipment on the bottom or surface. In various instances, the greater the challenges that are solved in a single application, the greater the return on investment in the process of digital transformation of production operations, in accordance with the established goals.

Figure 4:
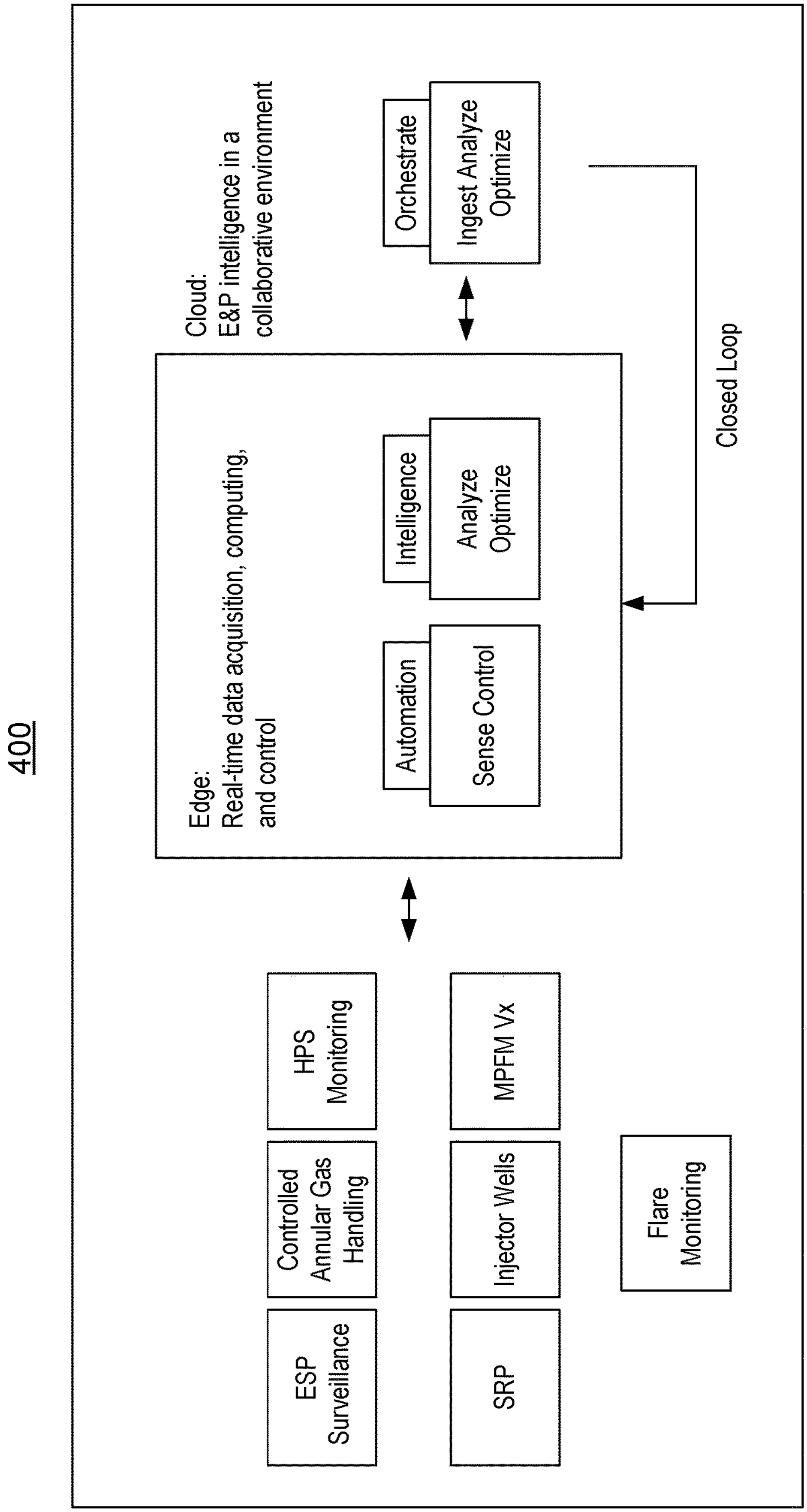
FIG. 4 illustrates an example of a system.

FIG. 4 shows an example of a system 400 that provides for connecting various elements of a production chain. For example, consider elements such as one or more of electro-submersible and mechanical pumps, multiphase meters, level meters, gas torches or burners, injection pumps, high pressure pumping equipment. Each of these elements may be connected through sensors, instruments or cameras, and with the data that are generated and collected for analysis, a framework may be provided for generating advanced alerts and/or controls to optimize operational efficiency using the information generated in real time. As an example, a connected asset may be monitored and may act autonomously based on information analyzed, for example, by combining edge computing and cloud platform computing (e.g., advanced alerts in the cloud, etc.). Such an approach may provide for cost effective modernization of various fields. As an example, a closed loop may be established between local and remote resources, which may operate in a manner that may depend on operational conditions locally, which may be controlled using one or more wholly local closed loop (e.g., a local closed loop controller).

Various areas of opportunity to improve may be identified when dealing with production operations and be considered in a first list of technical-economic feasibility. For example, consider processes such as: improving the data collection process, accuracy, speed and frequency of the captured value, real-time availability, and integration to databases, among others. The systems and processes to be improved may include, for example, integrity of completions, in-depth monitoring of artificial lift equipment, opening and closing of choke valves, level measurements in tanks, automation of the gas release process in the annulus of the well, automation in chemical injection processes, frequency of well-tests in remote locations, monitoring of emissions from burners or gas torches, integrated monitoring of "HPS" injection pumps, frequency variator "VSD", pressure and temperature sensors at the bottom and surface in wells, monitoring of tanks, separators, supervision through cameras, among others.

As an example, consider surveillance of electro-submersible pumping equipment (e.g., ESP surveillance). As an example, a mature field may implement a digital solution that bases production operations and engineering on different workflows that may utilize local network devices for monitoring electro-submersible pumping equipment. Such an approach may overcome lack of standardized databases as an underlying cause of different silos of information. For example, consider a field that utilizes different brands of frequency inverters where the different brands are completely disconnected.

Figure 5:
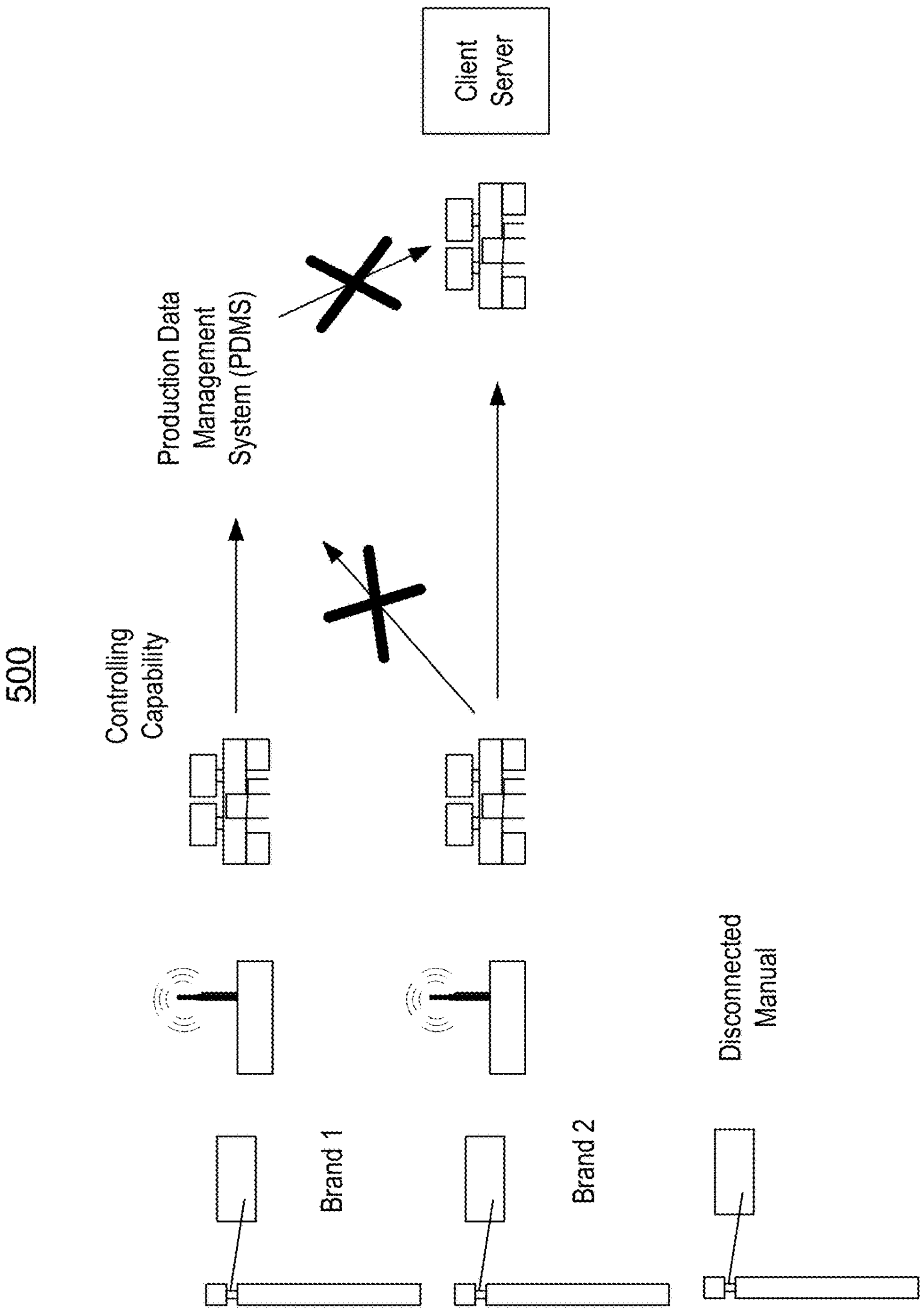
FIG. 5 illustrates an example of a system.

FIG. 5 shows an example of a system 500 where different brands of equipment may present one or more challenges. For example, such a system may rely on two different monitoring platforms where only one of them has the ability to control devices connected to it. In such an example, there may be a lack of control capacity in one of the platforms, which may result in a high number of shutdowns due to unwanted alarms (e.g., consider an average of 500 shutdowns per month for a population of approximately ninety (90) wells). Such a system may experience disconnection challenges that force personnel working in remote operations centers to manually search for anomalous parameters in the wells (e.g., one-by-one), which may be quite an extensive task to perform.

In the system 500, a first brand may be a type of equipment made by one manufacturer while a second brand may be a type of equipment made by another manufacturer. In such a system, equipment may include heterogeneous equipment in that equipment for a particular purpose includes equipment from different brands, which may have one or more different types of components, firmware, interfaces, protocols, etc. In such an example, interactions, data acquisition, control, etc., may be or become challenging due to one or more differences.

Figure 6:
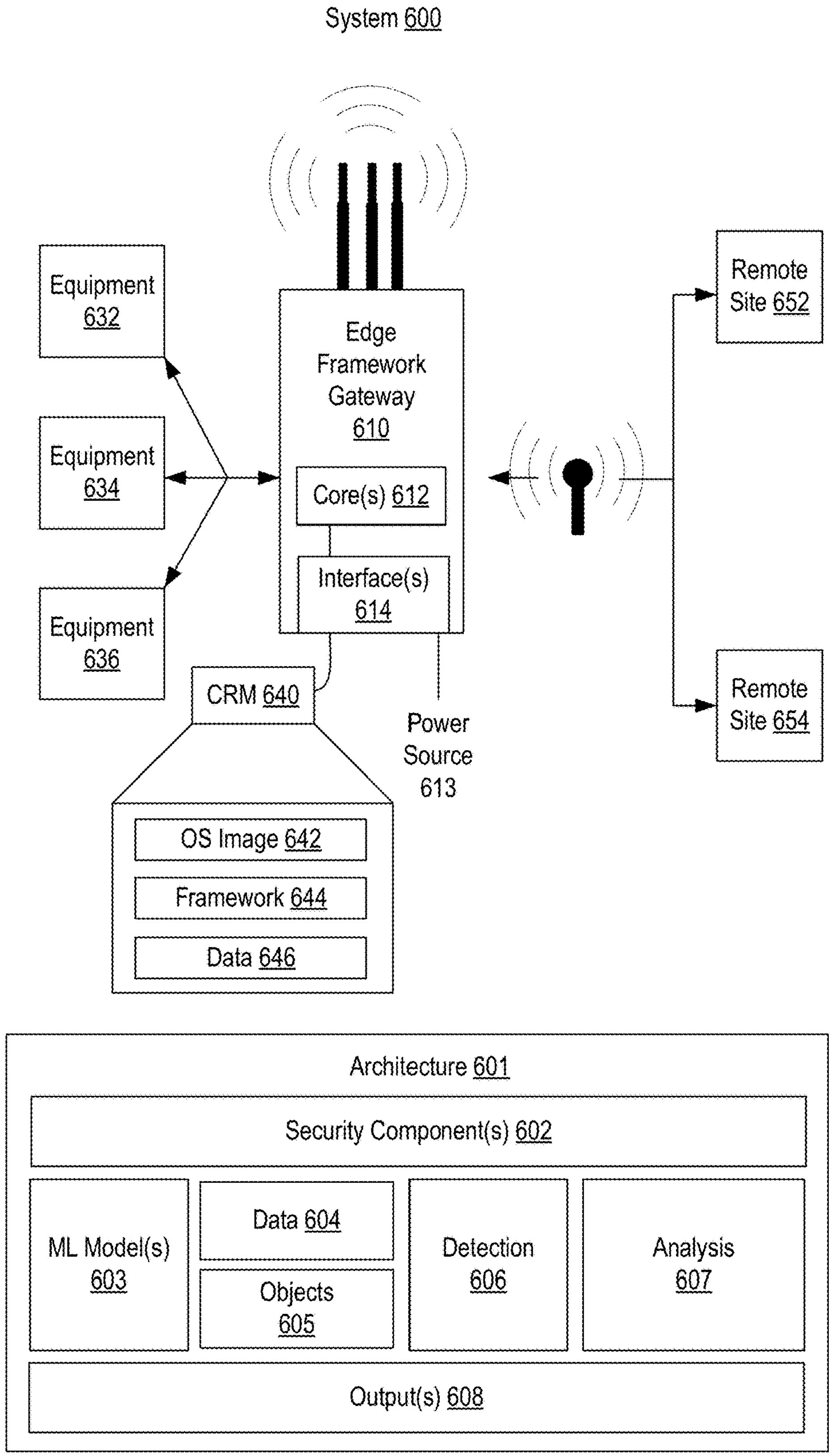
FIG. 6 illustrates an example of a system.

FIG. 6 shows an example of a system 600 and an example of an architecture 601 where the system 600 can include various local components that can be in communication with one or more remote components. As shown in the example of FIG. 6, the architecture 601 can provide for one or more security components 602, one or more machine learning models 603, data 604, objects 605, detection techniques 606 (e.g., classification, regression, recognition, prediction, etc.), analysis techniques 607 and output(s) 608. As an example, the system 600 may be operatively coupled to one or more pumps, which can include one or more ESPs. As an example, the system 600 may operate as a controller, a motor controller, etc., and/or provide information to a controller, a motor controller, etc.

As shown, the system 600 can include a power source 613 (e.g., solar, generator, battery, grid, etc.) that can provide power to an edge framework gateway 610 that can include one or more computing cores 612 and one or more media interfaces 614 that can, for example, receive a computer-readable medium 640 that may include one or more data structures such as an operating system (OS) image 642, a framework 644 and data 646. In such an example, the OS image 642 may cause one or more of the one or more cores 612 to establish an operating system environment that is suitable for execution of one or more applications. For example, the framework 644 may be an application suitable for execution in an established operating system in the edge framework gateway 610.

In the example of FIG. 6, the edge framework gateway 610 ("EF") can include one or more types of interfaces suitable for receipt and/or transmission of information. For example, consider one or more wireless interfaces that may provide for local communications at a site such as to one or more pieces of local equipment, which can include equipment 632, equipment 634 and equipment 636 and/or remote communications to one or more remote sites 652 and 654. In such an example, lesser or more equipment may be included.

As an example, a system may be operatively coupled to one or more pieces of surface equipment such as, for example, the edge framework gateway 610 of FIG. 6 may be operatively coupled to one or more ESPs. As an example, an ESP may be equipped with its own edge computing resources that can, at least in part, operate downhole for monitoring and/or control of the ESP. In various examples, one or more downhole sensors may acquire one or more pressures, one or more temperatures, a drive frequency, etc., which may be inputs to one or more models, monitoring and/or control components, etc. As an example, the equipment 632, 634 and 636 may include one or more types of equipment. As an example, equipment may include non-artificial lift equipment and/or artificial lift equipment.

As an example, the edge framework gateway 610 may be installed at a site where the site is some distance from a city, a town, etc. In such an example, the edge framework gateway 610 may be accessible via a satellite communication network and/or one or more other networks where data, control instructions, etc., may be transmitted, received, etc.

As an example, one or more pieces of equipment at a site may be controllable locally and/or remotely. For example, a local controller may be an edge framework-based controller that can issue control instructions to local equipment via a local network and a remote controller may be a cloud-based controller or other type of remote controller that can issue control instructions to local equipment via one or more networks that reach beyond the site. As an example, a site may include features for implementation of local and/or remote control. As an example, a controller may include an architecture such as a supervisory control and data acquisition (SCADA) architecture.

Satellite communication tends to be slower and more costly than other types of electronic communication due to factors such as distance, equipment, deployment and maintenance. For well sites that do not have other forms of communication, satellite communication can be limiting in one or more aspects. For example, where a controller is to operate in real-time or near real-time, a cloud-based approach to control may introduce too much latency.

As shown in the example of FIG. 6, the edge framework gateway 610 may be deployed where it can operate locally with the one or more pieces of equipment 632, 634 and 636, etc. As an example, the edge framework gateway 610 may include switching and/or communication capabilities, for example, for information transmission between equipment, etc.

As desired, from time to time, communication may occur between the edge framework gateway 610 and one or more remote sites 652, 654, etc., which may be via satellite communication where latency and costs are tolerable. As an example, the CRM 640 may be a removable drive that can be brought to a site via one or more modes of transport. For example, consider an air drop, a human via helicopter, plane, boat, etc.

As explained with respect to FIG. 6, a framework may execute within a gateway such as, for example, an AGORA gateway (e.g., consider one or more processors, memory, etc., which may be deployed as a "box" that can be locally powered and that can communicate locally with other equipment via one or more interfaces). As an example, one or more pieces of equipment may include computational resources that can be akin to those of an AGORA gateway or more or less than those of an AGORA gateway. As an example, an AGORA gateway may be a network device with various networking capabilities.

As an example, a gateway can include one or more features of an AGORA gateway (e.g., v.202, v.402, etc.) and/or another gateway. For example, consider features such as an INTEL ATOM E3930 or E3950 dual core with DRAM and an eMMC and/or SSD. Such a gateway may include a trusted platform module (TPM), which can provide for secure and measured boot support (e.g., via hashes, etc.). A gateway may include one or more interfaces (e.g., Ethernet, RS485/422, RS232, etc.). As to power, a gateway may consume less than about 100 W (e.g., consider less than 10 W or less than 20 W). As an example, a gateway may include an operating system (e.g., consider LINUX DEBIAN LTS or another operating system). As an example, a gateway may include a cellular interface (e.g., 4G LTE with global modem/GPS, 5G, etc.). As an example, a gateway may include a WIFI interface (e.g., 802.11 a/b/g/n). As an example, a gateway may be operable using AC 100-240 V, 50/60 Hz or 24 VDC. As to dimensions, consider a gateway that has a protective box with dimensions of approximately 10 in×8 in×4 in (e.g., 25 cm×20.3 cm×10.1 cm).

As an example, a system may include one or more components, features, etc., of a SENSIA system (SENSIA LLC, Houston, Texas), such as, for example, the SENSIA AVALON lift surveillance application and associated hardware. For example, such a system may include one or more edge gateways that may be operatively coupled to a surveillance and/or control system. As an example, a system may provide for implementation of Artificial Intelligence Response Prioritization (AiRP) for one or more pumps, which may include one or more ESPs. As an example, one or more machine learning models, which may include one or more trained and/or trainable machine learning models, may be implemented for detection of one or more unwanted events. In such an example, a system may provide for handling a number of wells for instantaneous detection of one or more types of issues. In such an example, a system may be operable to help prevent premature ESP failures field-wide while, for example, reducing or eliminating false alarms.

As an example, a system may include one or more features of the QRATE HCC2 controller (SENSIA LLC), which may include a dedicated ARM microcontroller, embedded I/O, serial communications unit(s), Ethernet unit (s), one or more serial ports, one or more GPS units (e.g., consider a GNSS receiver for time synchronization), a video port (e.g., consider an HDMI port for edge application touch interface, etc.), one or more wireless option features, one or more modems (e.g., 5G, 4G LTE, WIFI, etc.), firmware, operating system, etc. As an example, such a controller may provide for running DOCKER containers (Docker, Inc, Palo Alto, California), etc.

As an example, a system may include one or more VSDs that may include one or more integrated components for implementation of one or more machine learning technologies. For example, consider a VSD that includes a machine learning processing component operatively coupled to one or more sensor and/or data acquisition components whereby the machine learning processing component may provide for local and/or remote machine learning implementations, which, in turn, may provide for VSD control to control one or more electric motors of a pump or pumps. As an example, a VSD unit may include one or more types of sensors that may provide for generating sensor data as to one or more aspects of power supply, power quality, power utilization, data transmission via power cable(s), etc. For example, consider a VSD unit with an integrated or add-on data sensing and acquisition assembly that may provide for acquiring sensor data and transmitting such sensor data to other hardware, which may be processor-based hardware configured to execute one or more machine learning models to generate output that may be relevant to pump performance, VSD unit performance, well performance, environmental conditions, reservoir performance, etc. Such output may, for example, provide for improved control of one or more pieces of field equipment, as may relate to production and/or injection of fluid from or into a well, respectively.

As an example, a gateway may be part of a drone. For example, consider a mobile gateway that can take off and land where it may land to operatively couple with equipment to thereby provide for control of such equipment. In such an example, the equipment may include a landing pad. For example, a drone may be directed to a landing pad where it can interact with equipment to control the equipment. As an example, a wellhead can include a landing pad where the wellhead can include one or more sensors (e.g., temperature and pressure) and where a mobile gateway can include features for generating fluid flow values using information from the one or more sensors. In such an example, the mobile gateway may issue one or more control instructions (e.g., to a choke, a pump, etc.).

As an example, a gateway itself may include one or more cameras such that the gateway can record conditions. For example, consider a motion detection camera that can detect the presence of an object. In such an example, an image of the object and/or an analysis (e.g., image recognition) signal thereof may be transmitted (e.g., via a satellite communication link) such that a risk may be assessed at a site that is distant from the gateway.

As an example, a gateway may include one or more accelerometers, gyroscopes, etc. As an example, a gateway may include circuitry that can perform seismic sensing that indicates ground movements. Such circuitry may be suitable for detecting and recording equipment movements and/or movement of the gateway itself.

As explained, a gateway can include features that enhance its operation at a remote site that may be distant from a city, a town, etc., such that travel to the site and/or communication with equipment at the site is problematic and/or costly. As explained, a gateway can include an operating system and memory that can store one or more types of applications that may be executable in an operating system environment. Such applications can include one or more security applications, one or more control applications, one or more simulation applications, etc.

As an example, various types of data may be available, for example, consider real-time data from equipment and ad hoc data. In various examples, data from sources connected to a gateway may be real-time, ad hoc data, sporadic data, etc. As an example, lab test data may be available that can be used to fine tune one or more models (e.g., locally, etc.). As an example, data from a framework such as the AVOCET framework (SLB, Houston, Texas) may be utilized where results and/or data thereof can be sent to the edge. As an example, one or more types of ad hoc data may be stored in a database and sent to the edge.

Figure 7:
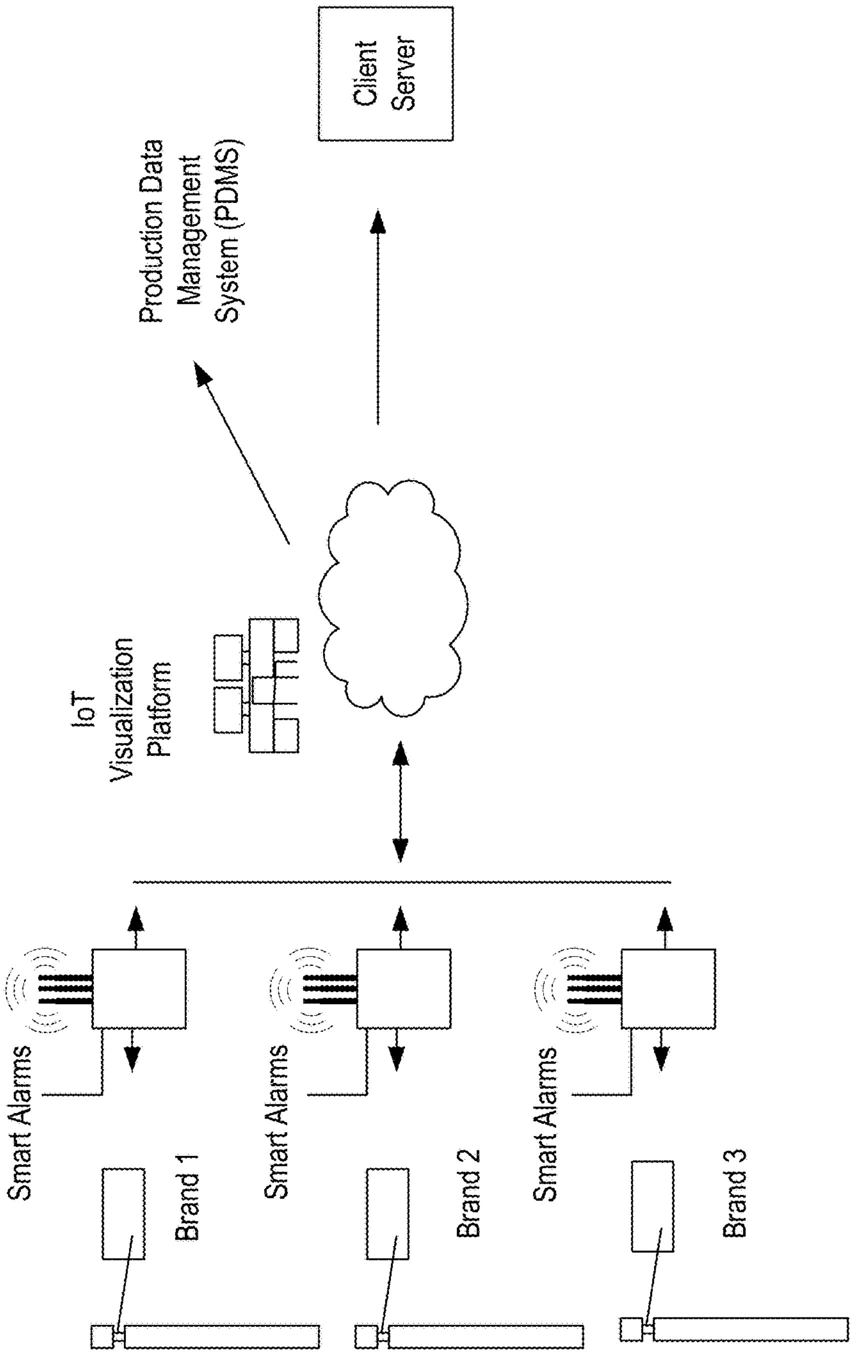
FIG. 7 illustrates an example of a system.

FIG. 7 shows an example of a system 700 that includes various edge devices that may be utilized to effectively standardize various brands such that field operations may be improved. As an example, the system 700 may include one or more features of the system 600 of FIG. 6.

As an example, the system 700 may provide for resolving connection and communication dilemmas between the different suppliers of variable speed variators (VSD) for electro-submersible pumping equipment, connecting them on a single platform that may allow information to be transmitted to the cloud and from the cloud feed one or more servers.

As an example, a system may provide for visualizing, monitoring and controlling various parameters from a common platform, including mechanical pumping equipment that may be connected, where information acquired in real time, for surveillance and control of the operating parameters of the different artificial lift equipment may be performed. As an example, a framework may generate and transmit intelligent alerts as to detection of anomalous behaviors (e.g., as may have been previously defined by monitoring center engineers), which may reduce manual labor with semi-automatic or automatic processes, for example, to indicate which wells may be focused upon (e.g., on a day-to-day basis) to improve their operational performance.

As an example, a system may provide for automated annular gas control. Gas handling has historically been a problem in mature fields, considering that they work at flowing bottom pressures lower than bubble pressure, therefore, there is a greater release of gas in the annular space, which causes lower efficiency of the equipment of electro-submersible pumping (e.g., sistemas de bombeo electrosumergible, "BES"), lower production and even major problems such as: gas blockages and lack of flow on the surface, which can incur in a premature failure of the equipment that is installed in the bottom.

As an example, a system may aim to increase the useful life of BES equipment, implementing intelligent alarms through digital technologies that automatically notify responsive to deviation from an operational range of the BES equipment (e.g., to reduce risk of failures). Historically, field operation has been primarily manual, where the operator has to visit each of the wells and take surface parameters such as head pressure and annulus pressure.

Figure 8:
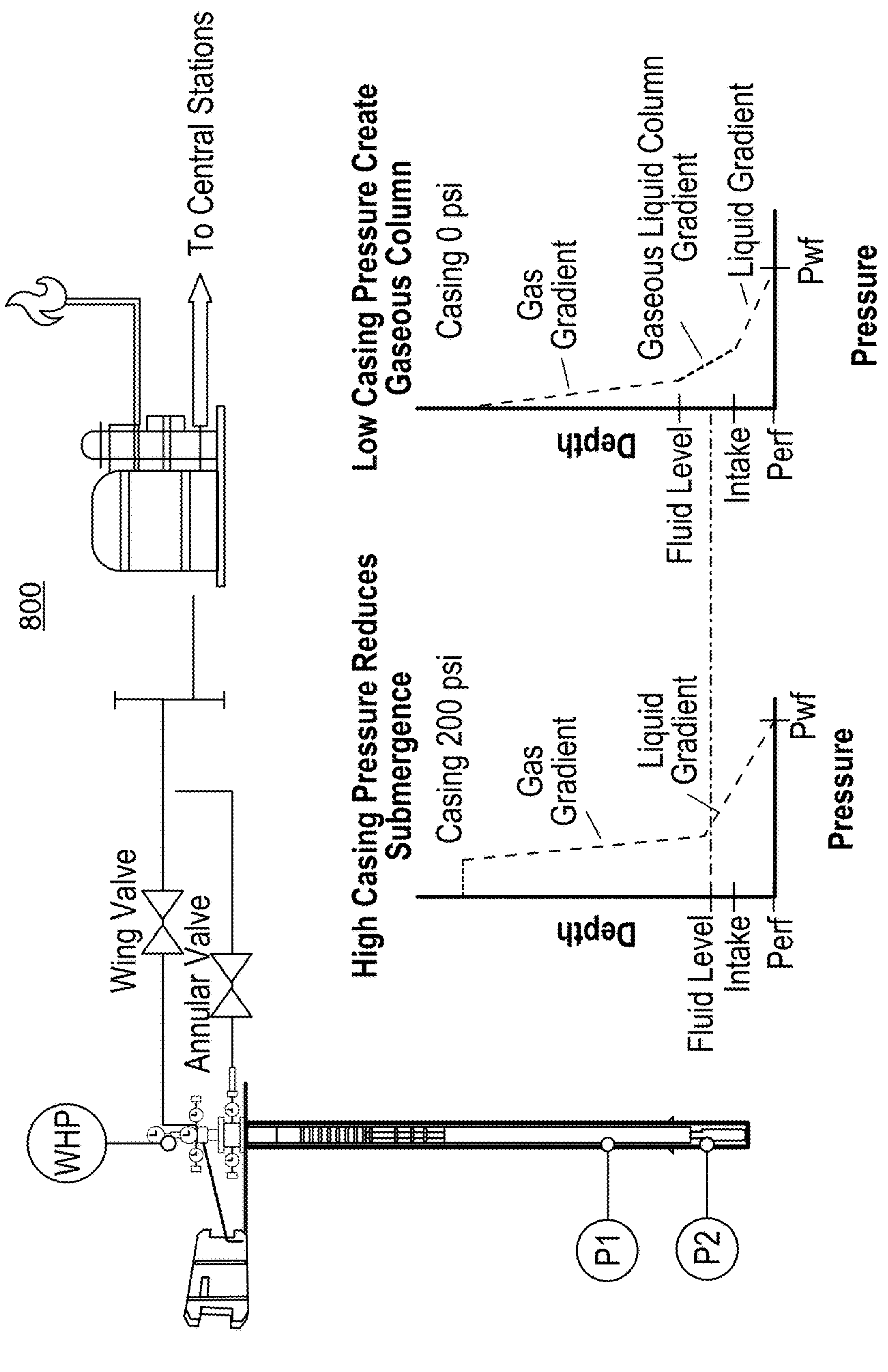
FIG. 8 illustrates an example of a system.

FIG. 8 shows an example of a system 800 to illustrate challenges. From the bottom to the surface, starting from the completion to the production facilities, there are the following elements: reservoir, bottom completion, production head, production lines, both for fluids and gas, manifold, production tanks and burner. In reference to the handling of gas in the annulus, if an annular valve is totally or partially closed, the liquid level in the annular space decreases, reducing the submergence of the pumps, affecting the production of the well and compromising the integrity of the BES due to the absence of fluid in the pump stages. Otherwise, if the annular valve is fully open or partially open, the hydrostatic column becomes light causing more gas to enter the pump stages and subsequent gas blocking of the equipment, again affecting production and possibly the integrity of the BES pump. Therefore, a well operator may have to manually try to find the optimal position of the annular valve to obtain rig stability; however, this manual operation is problematic for different reasons such as, for example, limited access to surface facilities (flooded cellars/handwheel valves) and in other cases the response of the well is very sensitive, and the operator who is at a well may not have a viewer to analyze the trend of the changes made. Furthermore, the behavior may change from well to well and finally the operator's knowledge may differ among criteria between the different shifts of the respective crews of operators.

As shown in the example of FIG. 8, various pressures may be measured or otherwise determined, which may include one or more downhole pressures (e.g., P1 and P2) and a wellhead pressure (WHP). As shown, equipment may include one or more valves, which may include an annular valve and a wing valve. As an example, one or more valves may be instrumented, controllable, etc. For example, consider a control system that may be operatively coupled to one or more valves for control thereof. As indicated in FIG. 8, fluid produced at a wellhead may be directed to one or more networks, which may include processing equipment, which may be operatively coupled to one or more central stations. In the example of FIG. 8, a central processing station may be in fluid communication with a number of wells where operation of each of the wells may impact operation of the central processing station. For example, as conditions change at one or more wells, conditions may change at processing equipment, which, in turn, may operate less efficiently or more efficiently. In various instances, a control system may provide for control of processing equipment in a manner that can respond to changes in conditions at one or more wells.

In the example of FIG. 8, an example of a high casing pressure scenario indicates that high casing pressure (e.g., consider 200 psi) can reduce submergence. In particular, a plot is shown of depth versus pressure where a fluid level depth, an intake depth, and a perforations (Perf) depth are indicated, along with associated pressures. As indicated, the highest pressure is at the greatest depth and gradients exist for liquid and gas (see liquid gradient below the fluid level depth and gas gradient above the fluid level depth). As shown in FIG. 8, another example corresponds to a low casing pressure scenario (e.g., consider approximately 0 psi). In the low casing pressure scenario, the low casing pressure may create a gaseous liquid column, which may thereby raise the fluid level depth. In such a scenario, the gaseous liquid column may have a pressure gradient that differs from that of the gas and that differs from that of the liquid (e.g., from a depth of the intake to a depth of the perforations).

Figure 9:
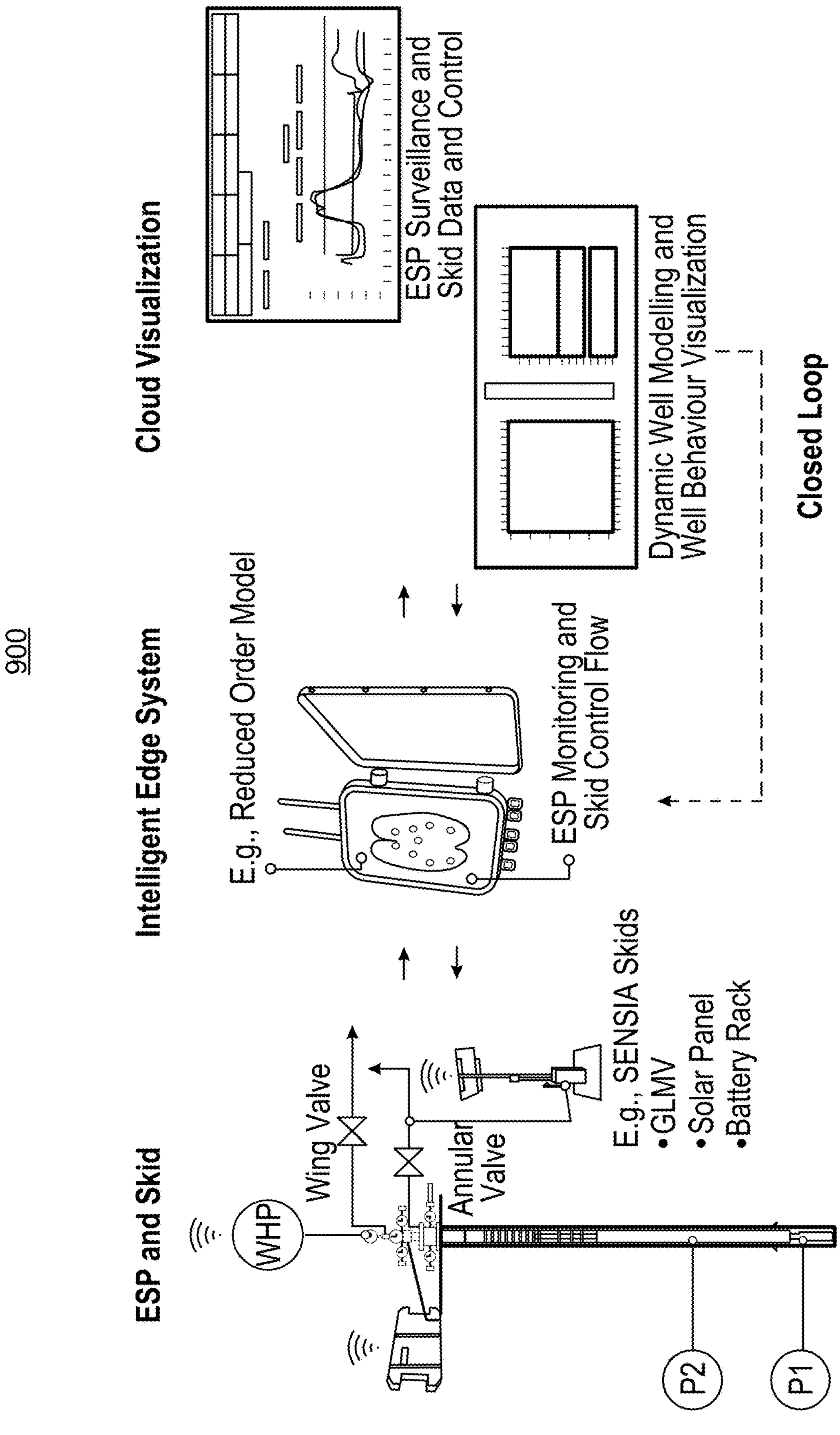
FIG. 9 illustrates an example of a system.

FIG. 9 shows an example of a system 900 that include an edge device-based approach that may provide for on-site control and/or a combination of on-site and remote control, for example, consider a closed loop control that involves on-site and remote equipment.

As explained, gas in an annulus may cause challenges and have a direct impact on production and performance of BES equipment. As an example, the system 900 may provide for constant and precise control of gas in an annulus. In such an approach, synergy may be created and leveraged between engineers from different disciplines to provide for remote operation. In the example of FIG. 9, the system 900 may include: 1) BES and Gas Skid as equipment, to perform the work of recording data; 2) Edge Intelligence System, as a party in charge of recording, processing data and making decisions in functions of algorithms and logic; and 3) Cloud Visualization, where information may be stored and presented in a clear and understandable way to one or more end users, additionally, one or more cloud platform-based resources may receive remote orders to be transmitted and executed. As an example, one or more features of the system 900 may provide for control of one or more field operations.

As an example, a gas skid may provide for precisely controlling opening of an annular valve based on data collected and analyzed. As an example, components may include a control valve (e.g., a Gas Lift Mandril Valve (GLMV)) with its opening and closing indicator, a solar panel, a battery kit and hoses or other conduits for gas inlet and outlet.

A gas skid may be wirelessly connected to a gateway that in parallel collects information from the BES and wireless sensors. The gateway may be acting as an electronic brain in such an architecture, where it collects the information, transmits the information generated by the sensors and the BES; and instructs the gas skid to calibrate valve response for smooth, automatic, controlled valve operation.

Such information may be sent through a visualization platform, where features may be implemented using platform-based resources to monitor skid gas information and variables computed together with other parameters of the BES equipment to ensure proper optimization of a well.

As an example, as to a unifying platform that allows connecting, monitoring, and controlling devices that are connected to it, historically a SCADA system may be implemented. However, the differential factor between a conventional SCADA system and a network of things (NoT) technology for a mature field may lie in the intelligence and autonomy of production operations, which may be achieved with the integration of the flow of data information from the sensors of the equipment in edge computing, where algorithms, artificial intelligence and machine learning processes are fed to optimize specific identified processes, minimizing manual intervention and maximizing production at a lower cost, accelerating the scalability of solutions that can be practically applied to one or more wells within one or more fields. In various examples, models may represent variables for the monitoring and optimization of a gas skid, such as a virtual flow meter (VFM), which may be a digital flow meter, that may be built within an edge device that may operate based on input to generate output akin to an actual flow meter, which may be relatively costly to install and maintain (e.g., consider cost and maintenance of a multiphase flow meter (MPFM), which may be considerable). As another example, consider computation of the submergence of electro-submersible pumping equipment, which becomes a noteworthy parameter if it is for a well with a high gas-oil ratio completed in a mature field.

As explained, an edge computing approach may provide for acquisition and processing of data at or very close to field equipment, control of parameters, and facilitation of automation of processes, which may reduce demands for moving large amounts of data to the cloud. As an example, an edge computing approach may call for acquisition and/or transmission of data that are required, which can be or not be processed data, such as alerts or diagnostics, thus optimizing costs for data transmission.

As explained, a system may be scalable, intelligent, and optionally autonomous, to benefit production, staff time, cost optimization and carbon footprint reduction.

As explained, a system may provide for transforming a field site using a single unifying platform that allows for implementation of an automated intelligent solution for handling gas in an annular space, thus obtaining a reduction of operating costs, a reduction of the exposure of personnel in the field, the integrity of the facilities, the operation and the reduction of the carbon footprint. When it comes to transforming traditional operations into smart production operations, a workflow may include implementing new processes and equipment that intelligently generate autonomy in the field, reducing repetitive tasks and increasing the productivity, simultaneously reducing the silos or disconnection that exists when collecting and processing the data that flows from its origin to the remote processing centers for decision making.

As an example, a framework may provide for carbon footprint computations via edge computing where, for example, remote operations may be carried out on an ESP surveillance workflow in a mature field. In such an example, a network of things (NoT) may be an Internet of Things (IoT) and/or a private network to facilitate remote-control monitoring and operation of ESPs in a manner that may lower carbon emissions (e.g., compared to traditional on-site operations).

As an example, a physics-based model may be utilized for estimating carbon footprint reduction, which may incorporate vehicle/transport efficiency and round-trip distance from a central station to each well site and applying equations from a global greenhouse gases (GHG) protocol to compute a carbon footprint reduction based upon a reduced travel brought about by the use of these networked technologies.

As an example, an integrated digital solution may combine a corporate environment standard defined globally for production operations, edge computing and network technology to enable remote operations of ESPs, and, for example, one or more other production chain elements like High Pressure Systems (HPSs), Casing Gas Handling Skids (CGHSs), Multiphase Flow Meters (MFMs), Sucker Rod Pumps (SRPs), Chemical Injection Skids (CISs), Methane Leaks Detectors (MLDs), among others. As an example, computations may be performed to determine a carbon footprint reduction.

Figure 10:
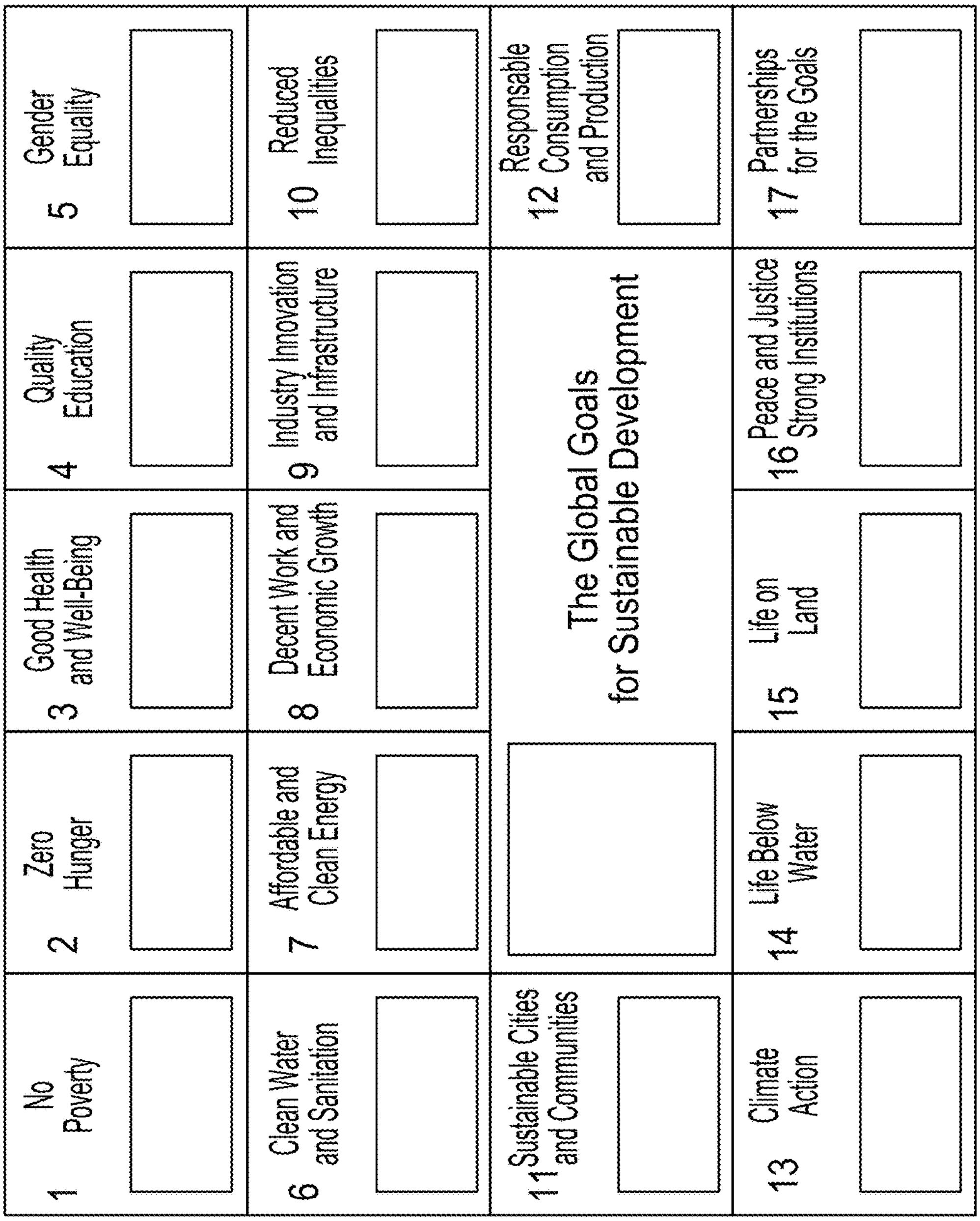
FIG. 10 illustrates an example of a graphic.

FIG. 10 shows a graphic 1000 of examples of Sustainable Development Goals (SDGs). As shown, a set of seventeen (17) interrelated ambitions goals may be considered, ranging from eliminating poverty to protecting the planet. As an example, a system may be implemented as part of a climate action goal where the system may provide for computation of carbon footprints with a relatively high level of confidence and accuracy. Such an approach may employ a robust edge gateway supported by a network of things (NoT) (e.g., optionally an IoT) to enable remote operations and compute the carbon footprint reduction using recommended formulas developed by the Global GHG Protocol and Intergovernmental Panel on Climate Change (IPCC) 2006 Guidelines for Greenhouse Gas Inventories.

Fossil fuels can release carbon dioxide (CO2 or $CO_2$) into the atmosphere, which can contribute to global warming. The World Resources Institute (WRI) and the World Business Council for Sustainable Development (WBCSD) developed the Greenhouse Gas Protocol to establish a "comprehensive global standardized framework to measure and manage greenhouse gas emissions from private and public sector operations, value changes, and mitigation actions".

Figure 11:
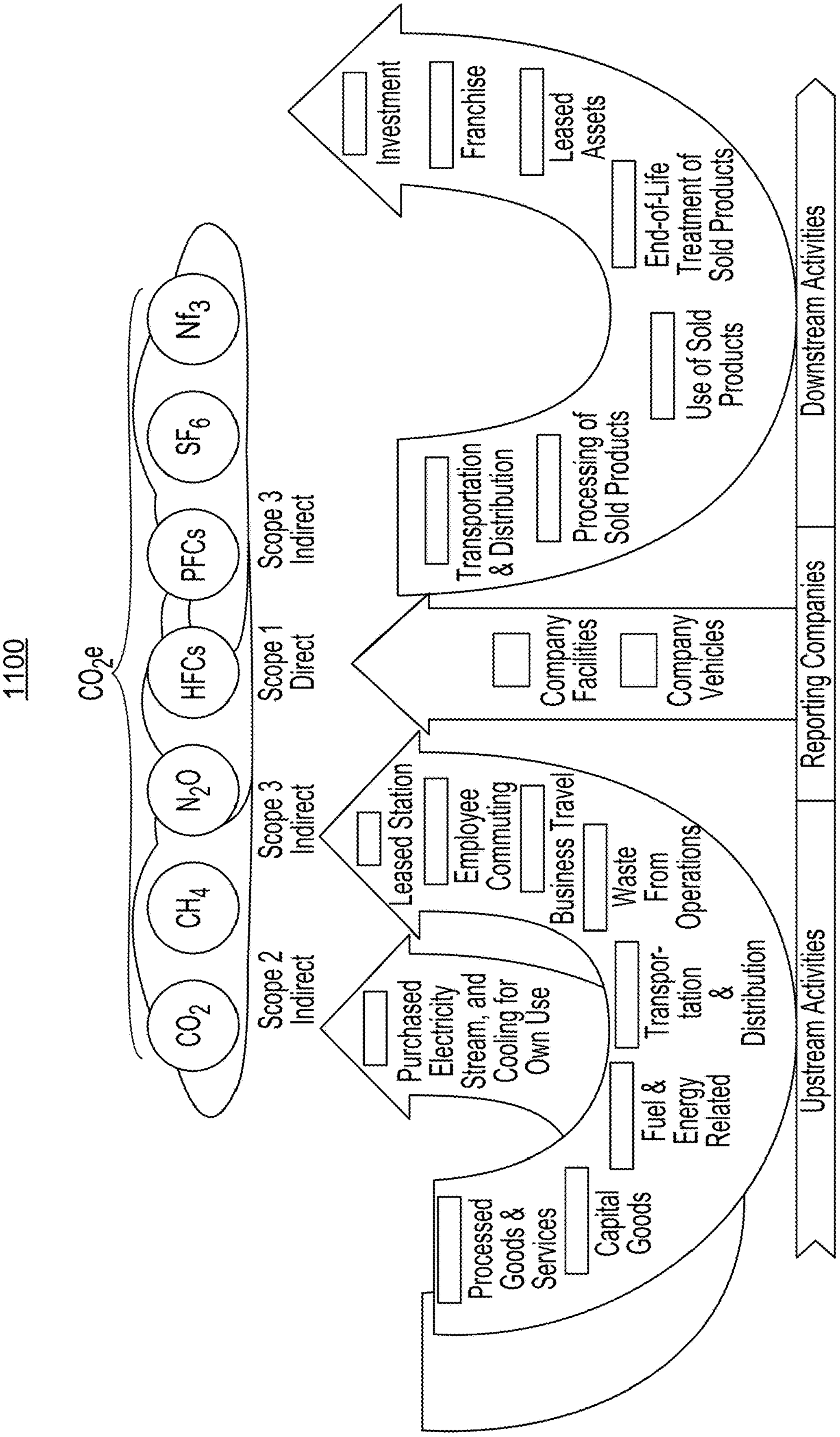
FIG. 11 illustrates an example of a graphic.

FIG. 11 shows a graphic 1100 of the GHG protocol, which outlines different scopes of emissions of which vehicles contribute to Scope 1 (direct). As an example, integrated production services may offer leveraging various technologies to improve production and reduce vehicle use by reduction in travel to and from well sites. As an example, a system may use edge computations hosted on an IoT gateway for acquisition of data. Such data may enable one or more of the following: an ability to act locally using algorithms running at the edge level; remote surveillance and operation; well and field production optimization; training of AI models; and recognition of insights, alarms, and anomalous behaviors from data gathered for one or more wells.

Figure 12:
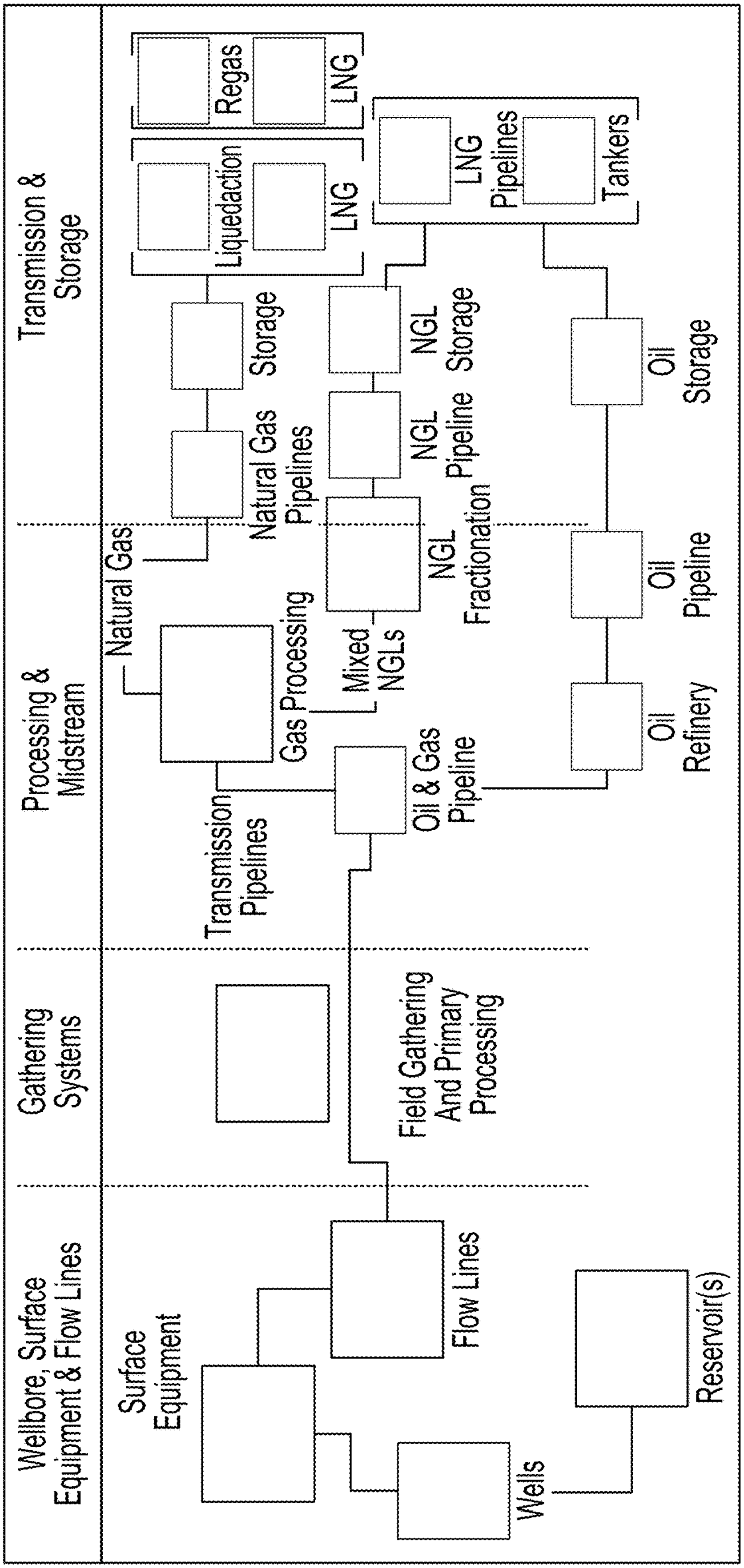
FIG. 12 illustrates an example of a system.

FIG. 12 shows a graphic 1200 of various processes. As an example, a system may implement one or more types of artificial lift technology such as, for example, electric submersible pump (ESP) technology, which may be part of an oil production stream (e.g., a production chain). The graphic 1200 includes various production chain elements and their connections, as it relates to the Global GHG Protocol Scope 1 related to vehicles.

Historically the oil and gas industry has had a relatively high carbon footprint in the different oil production phases as is shown in the graphic 1200, which shows how reservoir fluid is coming from the reservoir through to transmission and storage. The World Economic Forum has highlighted the energy sector as having the highest percentage of total emissions in 2020, at approximately 34%. As an example, to address emissions, a system may implement one or more of an Internet of Things (IoT), Digital Twins, AI/ML, and automation and robotics. Such digital technologies may be implemented by a system to remotely monitor, optimize, control, and learn from data at the edge. Applying this to oilfield production technologies can have the direct impact of improving resource efficiency and the reduction of onsite visits.

As an example, a digital twin may be a digital model of a piece of equipment that is a physical piece of equipment. In such an example, a digital twin may be generated using one or more of a physics-based model, a data derived model, and a hybrid model (e.g., hybrid physics-based and data derived, etc.). As an example, a digital twin may be or include a machine learning model that may be generated and implemented to receive input and produce output, which may be predicted output as would match output of its physical counterpart. As an example, a digital twin may be subjected to periodic or continuous learning such that the digital twin evolves dynamically over time as one or more physical counterparts are utilized, as field data are acquired, etc.

To understand the effect of the adoption of various technologies on emissions reduction, consider quantifying how such technologies may impact a global problem. A focus on ESPs and a reduction of onsite visits brought about by the integration of digital technologies into managing and optimizing these systems provides for illustration of techniques, systems, etc., which may be applied to one or more other types of field equipment, field operations, etc. In particular, one or more technologies may be implemented such that a reduction in emissions is realized, which is an actual, physical reduction in emissions of chemicals into the environment. For example, consider an internal combustion engine that may generate energy by combusting hydrocarbons in the presence of oxygen where emissions such as carbon dioxide may be formed. As an example, one or more techniques, technologies, etc., may be implemented to control such an internal combustion engine and/or otherwise reduce demand for use thereof, which, in turn, provides for less combustion of hydrocarbons in the presence of oxygen and hence less carbon dioxide emissions.

As an example, a system may provide a digitally integrated solution to compute a carbon footprint in real time. For example, a field implementation may combine GHG Protocol Domain Knowledge considering remote operations executed on ESP Variable Speed Drives (VSDs) and digital capability enabled by gateways supported on IoT and edge computing. As an example, an RWW approach may be implemented where a demand exists for carbon footprint computation in real-time for production operations. Such a demand may be linked to monitoring and controlling carbon emissions associated to ESP Pumps in the Scope 1. As an example, a system may provide for a prompt response in tracking GHG emissions to improve decision making, and creating an action plan proposal to help address global temperatures issues.

As an example, a system may provide for a type of connectivity for data delivery, monitoring, control, and edge intelligence over a number of different ESP VSD vendors, for example, by connecting to one standardized, secure, and scalable platform. In a trial, a system was implemented successfully for over two hundred and fifty (250) oil and water producer wells that previously were connected to two isolated monitoring and controlling platforms.

As an example, a system may provide a positive impact to an Environment, Social and Governance (ESG) company policy. As an example, a system may have the capability to decrease carbon footprint associated to Scope 1 by reducing diesel volume used in the vehicles (e.g., trucks) assigned to production operations. As an example, a system may support the Sustainable Development Goals 13th SDG "Climate Action" and ensure digitally ESG compliance.

As indicated, wells can produce with different types of recovery and artificial lift technologies. When the term recovery is mentioned, it refers to "reservoir energy" and normally the measured variable is "reservoir pressure". Natural flow and artificial lift methods refers to "primary recovery" and pertain to one or more different types of pumps installed inside of a well because it does not have enough energy to produce the reservoir fluid from downhole to surface levels.

Figure 13:
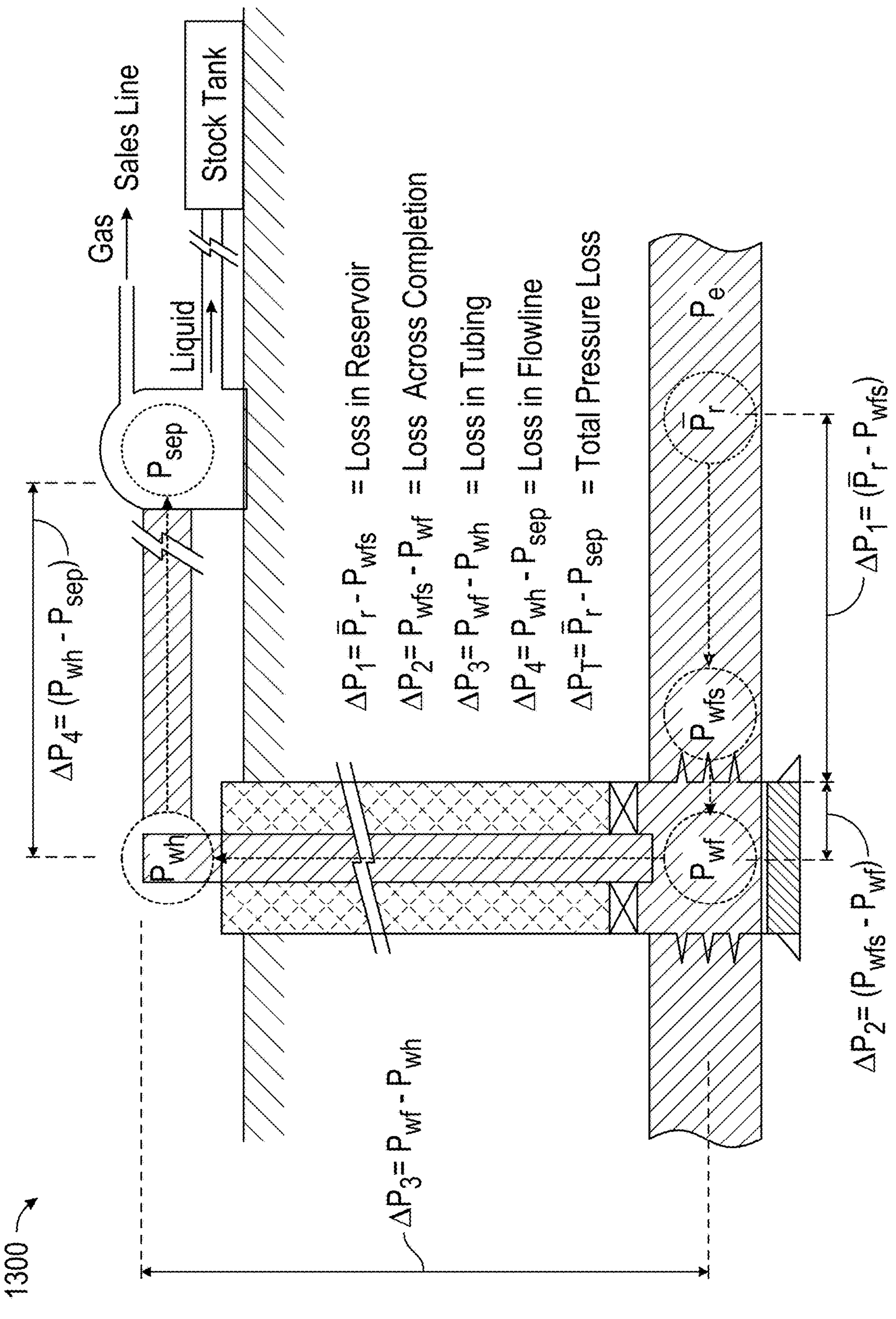
FIG. 13 illustrates an example of a system.

FIG. 13 shows a graphic 1300 of an example of a well system that includes various pressures that may be relevant to production. Normally, for different artificial lift types the measured variable is drawdown, which refers to differential pressure between the reservoir pressure ($P_r$) and wellbore downhole pressure ($P_{wf}$) as shown in the graphic 1300.

Various pressures are shown in the example graphic 1300, which can include wellhead pressure ($P_{wh}$), separator pressure ($P_{sep}$), flow pressure at or near perforations ($P_{wfs}$), and a subsurface environment pressure ($P_e$). As an example, one or more types of pressure losses may be computed, such as, for example, loss in reservoir ($\Delta P_1$), loss across completion ($\Delta P_2$), loss in tubing ($\Delta P_3$), loss in flowline ($\Delta P_4$), and total pressure loss ($\Delta P_T$). As an example, losses may be related to energy. As an example, a pump may be described as to its operation in terms of energy. As an example, energy may be related to emissions or carbon footprint. As an example, a framework may provide for characterizing, predicting, classifying, etc., one or more types of pressures, pressure losses, energies, emissions, carbon footprints, etc., which may thereby provide for improvement of control, efficiency, etc., of one or more field operations.

As an example, the graphic 1300 may be part of a graphical user interface (GUI) that may include one or more graphical controls that respond to input, whether from human and/or machine. For example, consider one or more sensors that may acquire sensor data that may be rendered to a GUI on a display where, for example, one or more digital twins may be utilized to generate synthetic data, which may mimic sensor data or a portion thereof. In such an example, control of equipment at a well site may be performed response to an assessment of field data and/or synthetic data where such control may be part of a larger overarching control scheme that may aim to improve efficiency and/or control emissions. As an example, consider a scenario where a digital twin may predict results from implementing a control action and where a GUI may include a graphical control actuatable to implement the control action based at least in part on such predicted results to, physically, alter production of one or more fluids from a well, which may be altered via a change in consumption of energy by one or more types of equipment.

As explained, ESPs may be utilized to enhance production. An ESP may operate by converting electrical energy into torque such that the ESP adds pressure to produce fluids, for example, by using a centrifugal pump powered up by a downhole rotary electric motor or a reciprocating pump powered by a downhole linear electric motor. As an example, electrical energy may be available from one or more sources, which may include, for example, a grid, solar, wind, a gas turbine, a piston engine, etc.

Figure 14:
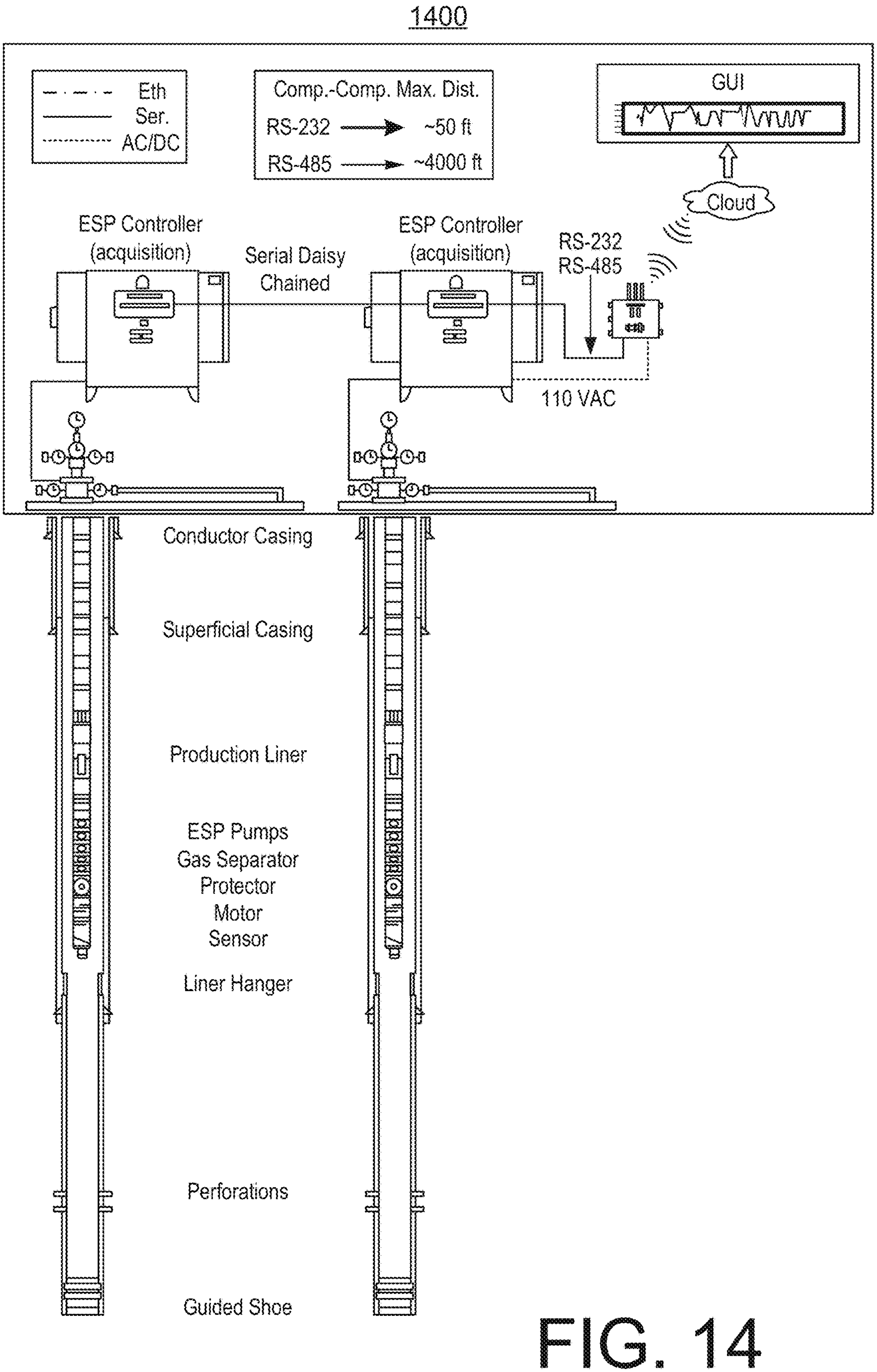
FIG. 14 illustrates an example of a system.

FIG. 14 shows a system 1400 that includes ESPs where electricity comes from surface using a power cable. As shown, an ESP system may include a variable speed drive (VSD), as an electronic device which synthesizes a three phase variable voltage, variable frequency power supply for induction or permanent magnet motors (e.g., for a three-phase motor, noting that different phase systems may be utilized), an ESP power cable to supply electricity to an ESP motors, pumps that may include multiple stages of impellers and diffusers that impart energy to the fluid and produce lift; pumps intakes that allow fluids to enter a pump; a motor to drive a pump and, for example, a gas separator; and a protector that may provide for protecting an electric motor, for example, to isolate a motor from well fluids, and to serve as a motor-oil reservoir, and equalize pressure between wellbore and motor.

As an example, one or more temperatures of one or more pump components and/or fluids may be taken into account. As an example, cooling of an ESP motor may be taken into account, which may impact operational efficiency and depend on flow generated by operation of the ESP motor along with temperature of fluid being pumped. Accordingly, various factors may be taken into account by a system, a framework, etc., that may aim to control a carbon footprint within a field.

As shown in the example of FIG. 14, the system 1400 may include one or more of Ethernet and serial channels. For example, consider one or more of RS-232 and RS-485 serial channels, which may be appropriately selected for transmissions of a particular distance, which may be within specifications for a maximum distance, etc. As shown, one or more components of the system 1400 may be powered using AC or DC power. As shown, one or more ESP controllers may be utilized, which may be daisy-chained using one or more serial channels. The example system 1400 may include more than one pump with a corresponding controller (e.g., a VSD, etc.) where such controllers may be operatively coupled using one or more serial channels to an edge device where the edge device may include one or more of a cellular and a satellite interface, for example, for communication with one or more resources in a cloud platform. As shown, cloud platform resources may provide for generating visualizations based at least in part on data received via one or more edge devices. As explained, a cloud platform may include resources for execution of a computational framework that may provide for issuance of control instructions to one or more edge devices such that field equipment may be controlled. In such an example, the computational framework may provide for assessment of data, issuance of control instructions, and, for example, dynamic generation of emissions and/or carbon footprint estimates, which may become more accurate with respect to time as data are received by the computational framework (e.g., from a vehicle management system, etc.).

Figure 15:
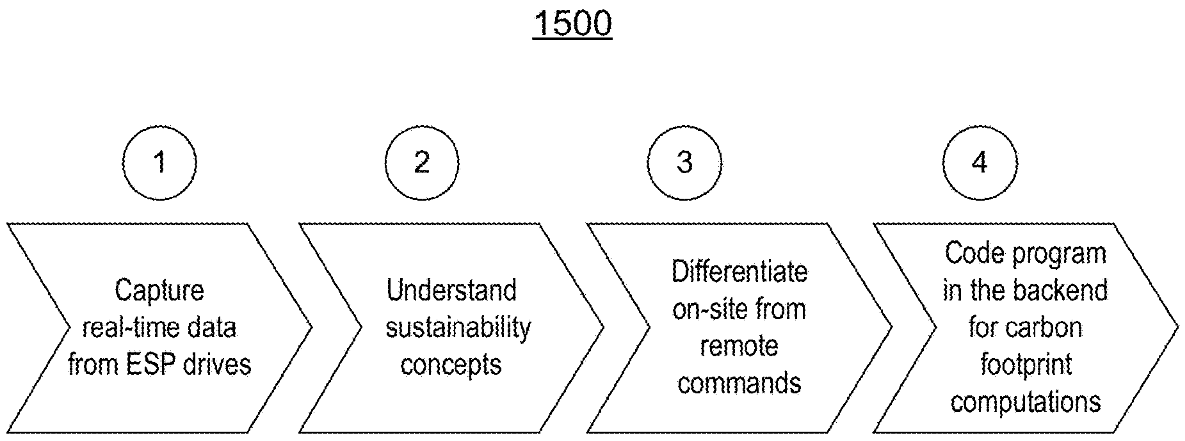
FIG. 15 illustrates an example of a workflow.

FIG. 15 shows a graphic 1500 of a workflow that includes various actions. In particular, the workflow includes four action blocks, labeled 1, 2, 3, and 4. The workflow can provide applying a GHG protocol to compute a carbon footprint in real-time where the actions may include capturing real-time data from ESP drives, assessing sustainability concepts, differentiating on-site from remote commands, and coding a program for carbon footprint computation. In such an example, the workflow may include issuing one or more instructions to one or more pieces of equipment to thereby form a loop, which may be an iterative loop with respect to time. In such an example, the workflow may be dynamic and provide for code modification, code generation, etc., that improves operations, for example, according to one or more sustainability concepts, goals, etc.

As to capturing real-time data from ESP drives, various variables from surface in the ESP drives may be captured, such as, frequency and amperage, also from downhole equipment in real time such as: motor temperature, intake temperature, intake pressure and discharge pressure, among others.

As to sustainability concepts useful in production remote operations, as an example, sustainability domain knowledge may be applied. For example, a GHG protocol per definition may have mapped Scope 1 direct greenhouse gases (GHG) emissions that occur from sources that are controlled or owned by an organization (e.g., emissions associated with fuel combustion in boilers, furnaces and vehicles). For this specific implementation, in a mature field where the oil is lifted predominantly with ESPs, the computation may be associated with the fuel volume reduction. For example, a truck's fuel may be diesel, and is used by vehicles assigned to production operations personnel and managed, where the emissions are reported for Scope 3.

As an example, a remote monitoring center may carry out different remote operations during a daily meeting, which may be at a remote location, for example, consider the Amazonian jungle. As an example, remote actions may be executed in both places, in the field or office, from a laptop or cellphone located in one or more of different cities taking advantage of a user interface built in a cloud environment. As to organization vehicles, they may be classified as "light vehicles, commonly named pick up" that use diesel as fuel for daily operations used by clients, for example, consider clients with operations in Latin America.

Figure 16:
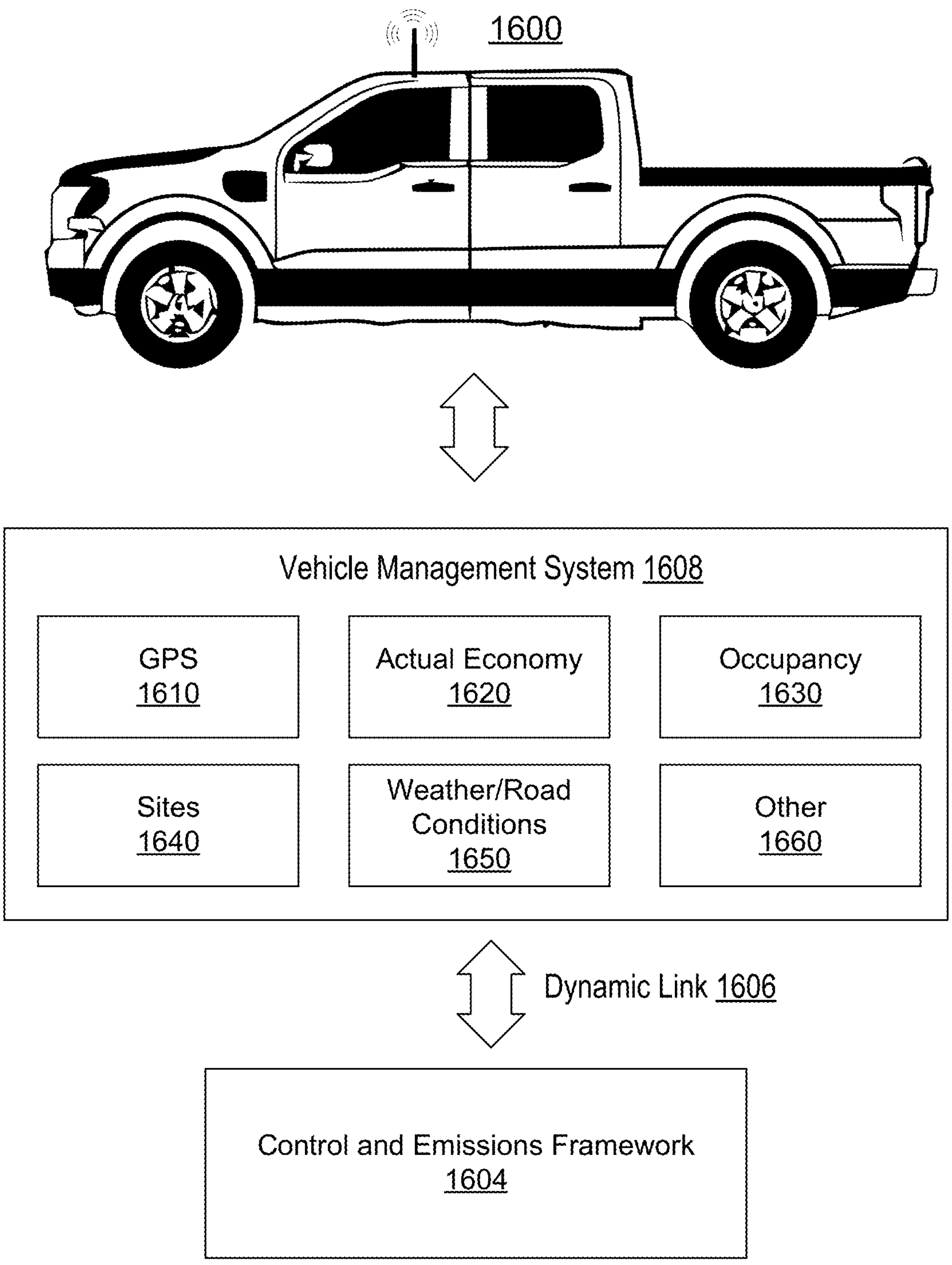
FIG. 16 illustrates an example of a vehicle.

FIG. 16 shows an example of a vehicle 1600, an example of a control and emissions framework 1604, and an example of a vehicle management system 1608, where the vehicle 1600 may be a diesel vehicle, a gasoline vehicle, a hydrogen vehicle, an electric vehicle, a hybrid vehicle, etc. As an example, such a vehicle may include a diesel engine, which may be a four-cylinder, six-cylinder, etc., engine. As an example, such an engine may be rated at more than 50 kW with a torque rating of approximately 200 newton-meters or more. While a diesel engine is mentioned, a vehicle may have a gasoline engine. As an example, a vehicle may be rated in terms of fuel consumption per unit distance, such as, for example, liters per kilometer, gallons per mile, etc. As an example, a vehicle may be rated in terms of fuel consumption as distance per unit of fuel (e.g., liters per 100 km).

According to statistics analysis carried out in the Ecuadorian jungle, the average efficiency ratio per vehicle in this specific field is 9.25 km/liter diesel, also noting that round-trip distances from a central station to each well performing the remote actions may be entered. Once a round trip in kilometers (km) is entered, based on the geographic information system map this number can be approximately equivalent to saved diesel fuel using an efficiency ratio per vehicle.

As an example, a system, a framework, etc., may be operatively coupled to one or more components of the vehicle management system 1608. For example, the control and emissions framework 1604 may be operatively coupled to the vehicle management system 1608 via one or more dynamic links 1606. As shown, the vehicle management system 1608 may include a GPS component 1610, an actual economy component 1620, an occupancy component 1630, a sites component 1640, a weather and/or road condition component 1650, and/or one or more other components 1660.

As an example, various scenarios may arise where one or more remote control instructions are transmitted to a field site, which, as explained, may help to avoid having to make a visit to the field site. However, in some instances, for one or more reasons, a visit may be required or otherwise desirable. For example, consider a scenario where a field engineer is notified of an issue at a field site where the field engineer aims to try and mitigate the issue by having a remote control instruction transmitted to equipment at the field site and lessen the severity of the issue or consequences thereof until the field engineer is able to arrive at the field site. As explained, remote control may be associated with a direct reduction in emissions and, hence, carbon footprint. However, in some instances, a remote control instruction may be associated with a trip to the field site such that a reduction in emissions may not be realized. In such instances, a control and emissions framework may receive data or signals from a vehicle management system that may be utilized for one or more purposes such that emissions and/or carbon footprint are more accurately determined.

As an example, data from a vehicle management system may be streamed to a control and emissions framework and/or accessed via one or more application programming interface (API) calls. In such an approach, a control and emissions framework may register a control instruction being transmitted as tentatively saving a trip to a field site and then confirming or disconfirming based on dynamically received data from a vehicle management system. For example, once data received are sufficient (e.g., consider GPS data) to confirm that a trip was made to the field site, then a tentative saving may be disconfirmed.

As an example, where a trip is to be initiated due to an issue at a field site, a control and emissions framework may operate in a coordinated manner with a vehicle management system to determine whether the trip may be leveraged for visiting one or more other field sites. In such a scenario, the occupancy of a vehicle may be assessed, for example, as to whether it can hold more than two people such that more than two people may be carried by the vehicle where the people may include one or more crew members for one field site and one or more crew members for another field site. In such an example, one or more determinations may be made based at least in part on control histories for one or more field sites. For example, if a particular field site has been subject of multiple remote control instructions that may indicate that some type of issue may exist at that particular field site, if a vehicle is to make a trip to a neighboring or along the way field site, then that vehicle may be scheduled to stop at the particular field site for an inspection to determine why it has been subject of multiple remote control instructions. In response, a forensic report may be issued to a control and emissions framework that identifies a reason or that merely states operation is normal. In turn, the control and emissions framework may learn from such feedback as to behaviors related to control and thereby provide for further improvement of techniques to reduce emissions and/or carbon footprints.

As an example, the vehicle management system 1608 may provide for updating the control and emissions framework 1604 with specific journey data, which may include actual economy (e.g., actual fuel economy), actual load (e.g., occupants or other), sites visited, topography (e.g., inclines, declines, etc.), weather and/or road conditions, etc. In turn, the control and emissions framework 1604 may tailor savings, decision-making, control instructions, etc. For example, where a trip is saved, the control and emissions framework 1604 may accurately quantify emissions and/or carbon footprint reduction based on one or more factors, such as, for example, weather, road conditions, vehicle economy, etc., that may have been expected if the trip was actually made. In such a manner, the control and emissions framework 1604 may provide for real-time assessments of emissions and/or carbon footprints that may be based on historical and/or current data (e.g., weather, etc.), and/or that may be dynamically updated to become more accurate with respect to time as data are received.

As an example, a system, a framework, etc., may provide for building one or more machine learning models for vehicle trips to field sites where such one or more models, once built, may provide for generating predictions as output for given input. For example, consider a machine learning model that may be trained and/or retrained using data from a vehicle management system such that a trip taken and/or a trip saved may be quantified in terms of emissions and/or carbon footprint. In such an example, as explained, a system, a framework, etc., may provide for planning of one or more trips in an effort to help gain knowledge as to field operations, reduce emissions and/or carbon footprints, and/or implement control. As an example, such planning may leverage one or more machine learning models for one or more journeys, where such an approach may account for vehicles available, vehicle choice, vehicle load, weather, road conditions, inclines, declines, etc. In some instances, for example, depending on whether weather and/or road conditions are favorable or not, a more efficient vehicle may be selected or a less efficient but more rugged vehicle may be selected (e.g., able to handle mud, water, snow, ice, etc.).

As explained, decisions to issue remote control instructions may be made automatically, semi-automatically, and/or manually. In such an approach, remote control instructions may be linked with an emissions and/or carbon footprint engine that can compute how the remote control instructions impact emissions and/or carbon footprints in a dynamic manner. As explained, emissions and/or carbon footprint reductions may be realized in terms of saved trips, where types of trips saved may be characterized using historical and/or real-time data. Such an approach may provide for issuing instructions to a vehicle management system that may provide for planning and/or executing one or more trips where such trips may be more intelligent, efficient, etc. Hence, a system may provide for improvements in production of fluids at well sites of a field, improvements in vehicle usage, improvements in human resources, improvements in emissions and/or carbon footprints, etc.

As an example, a system may provide for commencing operation of pumps at multiple well sites, where the pumps provide for production of fluid from one or more reservoirs via wells at the multiple well sites. In such an approach, the commencement of operation may occur in a relatively simultaneous manner or other scheduled manner that does not depend on vehicle trips to the well sites. For example, if vehicle trips are required to commence operation of pumps at multiple well sites, then, the rate-limiting factor may depend on number of vehicles, number of crews and/or crew members, weather, road conditions, etc. As explained, a control system that provide for remote control of pumps can provide for start-up of the pumps at multiple well site in a coordinated manner that may provide for improved operation at one or more processing facilities. For example, in contrast to a vehicle trip-based approach, where flow to a central processing facility from multiple wells may depend on visit-by-visit adding-on, a remote control-based approach may tailor flow in a desirable and beneficial manner such that the central processing facility may scale-up more efficiently. In such an approach, a processing facility may be more efficient, which, in turn, may provide for a reduction in emissions and/or carbon footprint.

Figure 17B:
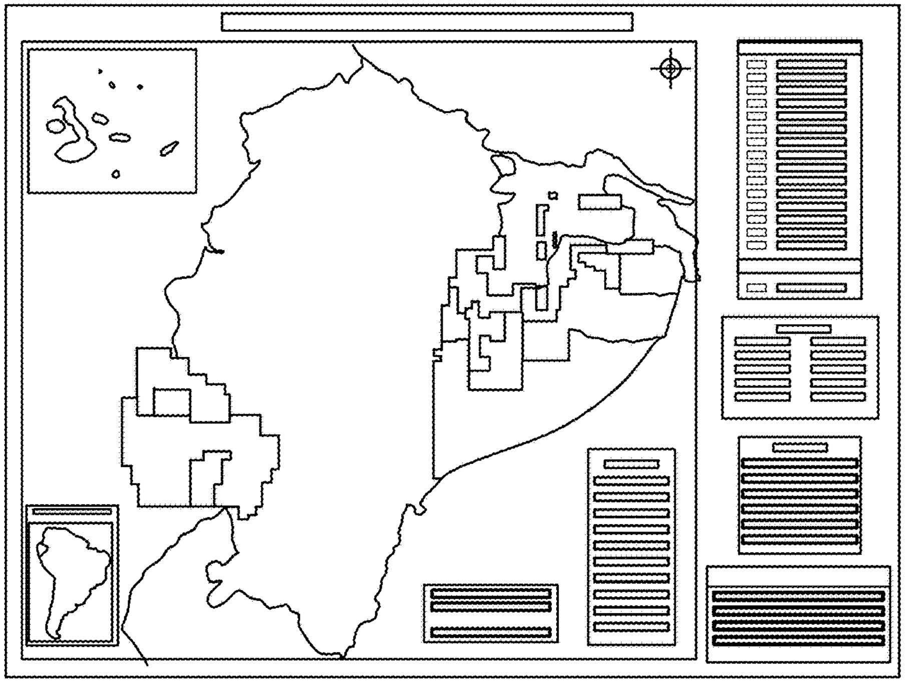

FIG. 17A, FIG. 17B, and FIG. 17C show various graphics 1700 that may include various types of data, information, etc., associated with a framework for computing carbon footprint in real-time. As an example, a GHG Protocol related to stationary combustion factor, conversion factors may be utilized, as in one of the tables of FIG. 17A, FIG. 17B, and/or FIG. 17C, from which carbon dioxide in equivalent tons may be computed. As shown, a table of carbon emissions factors by fuel may be utilized (e.g., Intergovernmental Panel on Climate Change (IPCC) 2006 Guidelines for Greenhouse Gas Inventories).

In FIG. 17B, a map is shown, which includes locations where operations are executed, drawing one vertical line from North to South is 80 km (length distance) and also from field to main office is about 300 km (see, e.g., https://www.recursosyenergia.gob.ec/mapa-de-bloques-e-infraestructura-petrolera-del-ecuador).

As an example, a workflow may differentiate on-site from remote commands sent remotely. For example, consider logic running in a backend to understand what remote operations are executed in an ESP surveillance workflow and reasons to execute them in the remote monitoring center. FIG. 17C includes tables of remote operations and reason for carry out each in an ESP surveillance workflow.

As an example, a criterion may be a "time frame remote operations" criterion as not all remote commands sent to ESP equipment may be considered as contributing to carbon footprint reduction. A time frame considered may be approximately thirty (30) minutes, and in the physical world represents that the operations carried out by one production operator in a lapse of thirty minutes is "only one contribution for carbon footprint reduction". This assumption may be made to avoid duplicated or inflated carbon footprint reduction reported per organization. This is the concept of "digital production operator", for a solution feature, noting that additional code may be written in a gateway to carry out autonomous operations and reduce human intervention adding additional equivalent tons of CO2 emissions (e.g., programmed once or twice per day according to a rule defined).

As explained, a workflow may include a code program in a back-end for carbon footprint computation, which, as mentioned, may occur in real-time. As an example, a generic definition of carbon emission intensity (EI) may be utilized, such as, for example: CO2 EI=(Total Life Emissions (kg CO2e))/(Total Production (bbl)).

As an example, for a specific section in the oil production stream which is "wells" consider total life emissions to be defined as follows:

$$\text{CO2 Emission Intensity} = \frac{\text{Scope 1} + \text{Scope 2} + \text{Scope 3}\lceil \text{KgCO2}e \rceil}{\text{Total Oil Production } \lceil Bopde \rceil} = \frac{(\text{Fuel} * CF) + (\text{Gas} * CF) + (\text{Electricity} * CF)\lceil \text{KgCO2}e \rceil}{\text{Total Oil Production } \lceil Bopde \rceil}$$

where CF is conversion factor.

As an example, a code program may be dynamically built, selected, etc., depending on one or more factors. For example, consider a code database that may provide for code that may be selected and assembled to generate output. As an example, a framework may include a dynamic code assembly component that may operate responsive to data received, one or more data assessments, etc. As an example, one or more types of code may provide for characterizing travel-related data with respect to emissions. For example, consider code that may provide for utilization of travel-related data as may be available from a vehicle management system (e.g., as to types of vehicles, fuel(s) utilized, catalytic converter or other emissions technologies, economy of vehicles in real-world conditions, weather, road conditions, loads, etc.). While CO2 is mentioned, as an example, a framework may provide for computations as to one or more other GHGs, combustion components, etc. For example, consider NOx emissions, particulate emissions, etc.

As an example, a framework may automatically adapt to one or more regulatory schemes. For example, consider a framework that may select one or more computational components responsive to location information as to one or more well sites. In such an example, a reporting requirement may be specific to a location (e.g., a government authority, etc.) whereby code components are assembled responsive to receipt of location information to provide for dynamic generation of one or more reportable values, which may correspond to one or more types of emissions, etc.

As an example, Scope 1 may be programmed following the computation explained in detail to estimate Scope 1 emissions (see, e.g., FIG. 17A, FIG. 17B, and FIG. 17C). As to variables, these are shown in the top table of FIG. 17A for real-time carbon footprint computation.

As an example, a framework may use gateway and edge technology with IoT environment and may be replicable in onshore and offshore environments worldwide.

Figure 18:
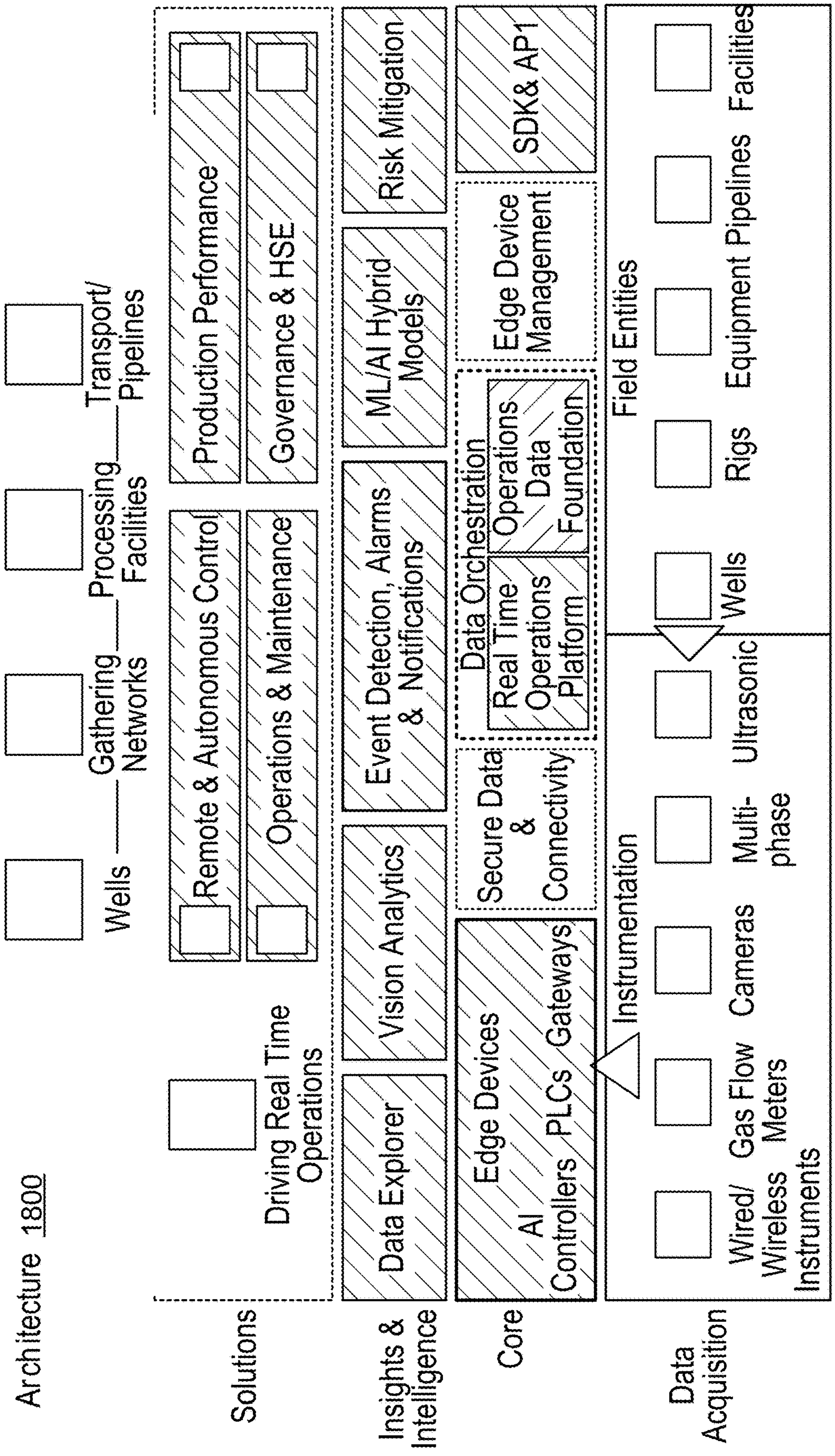
FIG. 18 illustrates an example of a system.

FIG. 18 shows an example of a system architecture 1800 that may be suitable for oil and/or gas workflows. As shown in FIG. 18, the system architecture 1800 may be layered. For example, consider a data acquisition layer for field entities like wells, drilling/workover rigs, and midstream equipment, such as pipeline or facilities, are sources of data which are instrumented using various sensors and actuators. Measurements can be made using wired or wireless sensors such as gas flow meters, cameras, multiphase flow meters, and ultrasonic meters. Additionally, actuators and controllers can be added into this layer to control entities at the edge via RTUs and PLCs. As an example, an IIoT core layer may include edge devices and an IIoT gateway connect with the instrumentation, controllers, and actuators in the data acquisition layer and collect and transmit data securely to an offsite data aggregator that can be in the cloud or an enterprise network. On the gateway, the ability to provide edge computing and artificial intelligence capabilities is possible depending upon the solution required. To manage this layer, edge device management may be included to manage the lifecycle and security of the edge devices, their applications, and the data that is generated. Domain specific edge applications built using IIoT SDKs and edge APIs can be deployed and updated remotely to allow a flexible system to meet evolving needs, including business, security, or customer requirements. As an example, an insights and intelligence layer may be included that, once data are transmitted from the edge, applications that allow exploration, computation, and learning capabilities may be executed. This layer may provide infrastructure for accessing these capabilities via web resources. As an example, a solutions layer may provide solutions to drive real-time operations. For example, consider remote and autonomous control, production performance optimization, operations and maintenance capabilities, and enforcement or monitoring of HSE policies and procedures.

After IoT Implementation, orders of magnitude lower latency versus manual data gathering and actions, a system may have the ability to recognize problems earlier or to optimize sooner to further improve production, cost of maintenance, asset total value, and reduced total cost of ownership. As explained, various IoT solutions generate valuable insights for various production workflows interrelated covering: Electric Submersible Pumps (ESPs), Sucker Rod Pumps (SRPs), High Pressure Pumps (HPPs), Automated Gas Handling Skids (AGHSs), Multi-phase Flow Meters (MPFMs), and Chemical Injection Skids (CISs).

Figure 19:
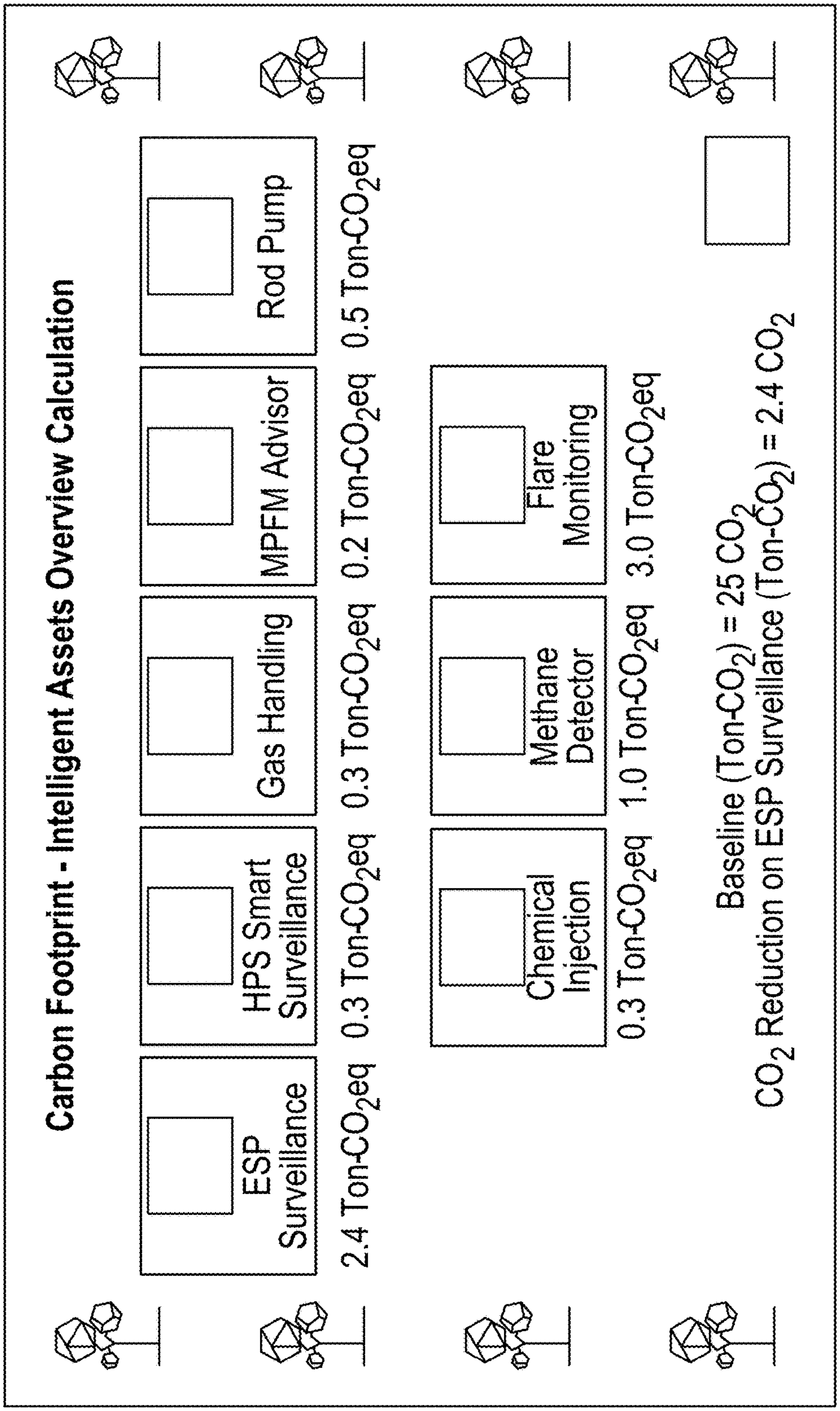
FIG. 19 illustrates an example of a system.

FIG. 19 shows an example graphic 1900 of an overview of various computations that may provide for improved operations. In the graphic 1900, various production chain elements are connected. For example, consider a framework that may include features for performing various computations, which may include carbon footprint and/or emissions computations. As shown in the example of FIG. 19, computations may be for one or more of ESPs, HPSs, gas handling, MPFMs, rod pumps, chemical injectors, methane detectors, flare monitors, etc.

As explained, a system may use real time data coming from ESP drives located in a mature field from surface and downhole level, and from the remote operations carry out in operations center located in Amazonian Jungle, where carbon footprint computations are made in real-time for Organization Scope 1, where one or more physics-based models may be implemented (e.g., consider models from GHG protocol).

As explained, an integrated digital solution may combine corporate environment standard defined globally for production operations, where edge computing technology supported by Internet of Things enables remote operations of ESP, and where computations are used to compute the carbon footprint reduction, and reporting of results. With a digital solution running in real-time, values may be available to estimate CO2 emissions for production chain elements connected and transmitting to an IIoT Platform, like High Pressure Systems (HPS), Casing Gas Handling Skids (CGHSs), Multi-phase Flow Meters (MPFMs), Sucker Rod Pumps (SRPs), Chemical Injection Skids (CISs), Methane Leaks Detectors (MLDs), among others.

As explained, a system may achieve tons of CO2 equivalent reduction in real time for Scope 1 related to "Company's Vehicles". As explained, an ESP workflow for carbon footprint reduction increased from 0.41 to 2.45 (six times) the number of Tons of Carbon Dioxide Equivalent per month (tons CO2 e per month). An integrated digital solution may provide for measuring the carbon footprint in real-time in production chain elements connected and transmitting to an IoT platform to address emissions associated with one of the three highest emitting sectors which is the energy sector.

As an example, a smart system may integrate sensors and connected assets to decarbonize faster the traditional oil and gas industry.

Valuable insights can be generated with this type of implementation considering that wells connected and transmitting to an IoT platform give tons of carbon dioxide equivalent per each time period, in that sense, IoT enables the capability to take actions using a smart asset connected approach.

As explained, a system may combine an ESG standard defined globally for production operations where the power of edge computing technology supported by IoT (e.g., NoT) can compute digitally a carbon footprint using differentiation between onsite and remote-control commands performed by an entity using an edge computing user interface.

As to types of machine learning (ML) models, consider one or more of a support vector machine (SVM) model, a k-nearest neighbors (KNN) model, an ensemble classifier model, a neural network (NN) model, etc. As an example, a machine learning model can be a deep learning model (e.g., deep Boltzmann machine, deep belief network, convolutional neural network, stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, back-propagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a machine learning model may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange with various other frameworks.

As an example, the TENSORFLOW framework (Google LLC, Mountain View, CA) may be implemented, which is an open-source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a training method can include various actions that can operate on a dataset to train a ML model. As an example, a dataset can be split into training data and test data where test data can provide for evaluation. A method can include cross-validation of parameters and best parameters, which can be provided for model training.

The TENSORFLOW framework can run on multiple CPUs and GPUs (with optional CUDA (NVIDIA Corp., Santa Clara, California) and SYCL (The Khronos Group Inc., Beaverton, Oregon) extensions for general-purpose computing on graphics processing units (GPUs)). TENSORFLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system-based platforms.

TENSORFLOW computations can be expressed as stateful dataflow graphs; noting that the name TENSORFLOW derives from the operations that such neural networks perform on multidimensional data arrays. Such arrays can be referred to as "tensors".

As an example, one or more features of the KERAS library may be utilized. The KERAS library is an open-source library that provides a PYTHON interface for artificial neural networks (ANNs). The KERAS library can act as an interface for the TENSORFLOW library.

As an example, a device may utilize TENSORFLOW LITE (TFL) or another type of lightweight framework. TFL is a set of tools that enables on-device machine learning where models may run on mobile, embedded, and IoT devices. TFL is optimized for on-device machine learning, by addressing latency (no round-trip to a server), privacy (no personal data leaves the device), connectivity (Internet connectivity is demanded), size (reduced model and binary size) and power consumption (e.g., efficient inference and a lack of network connections). TFL includes multiple platform support, covering ANDROID and iOS devices, embedded LINUX, and microcontrollers. TFL provides diverse language support, which includes JAVA, SWIFT, Objective-C, C++, and PYTHON. TFL provides high performance, with hardware acceleration and model optimization. As an example, one or more machine learning tasks may include, for example, classification, regression, object detection, pose estimation, question answering, text classification, etc., on one or more of multiple platforms.

Figure 20:
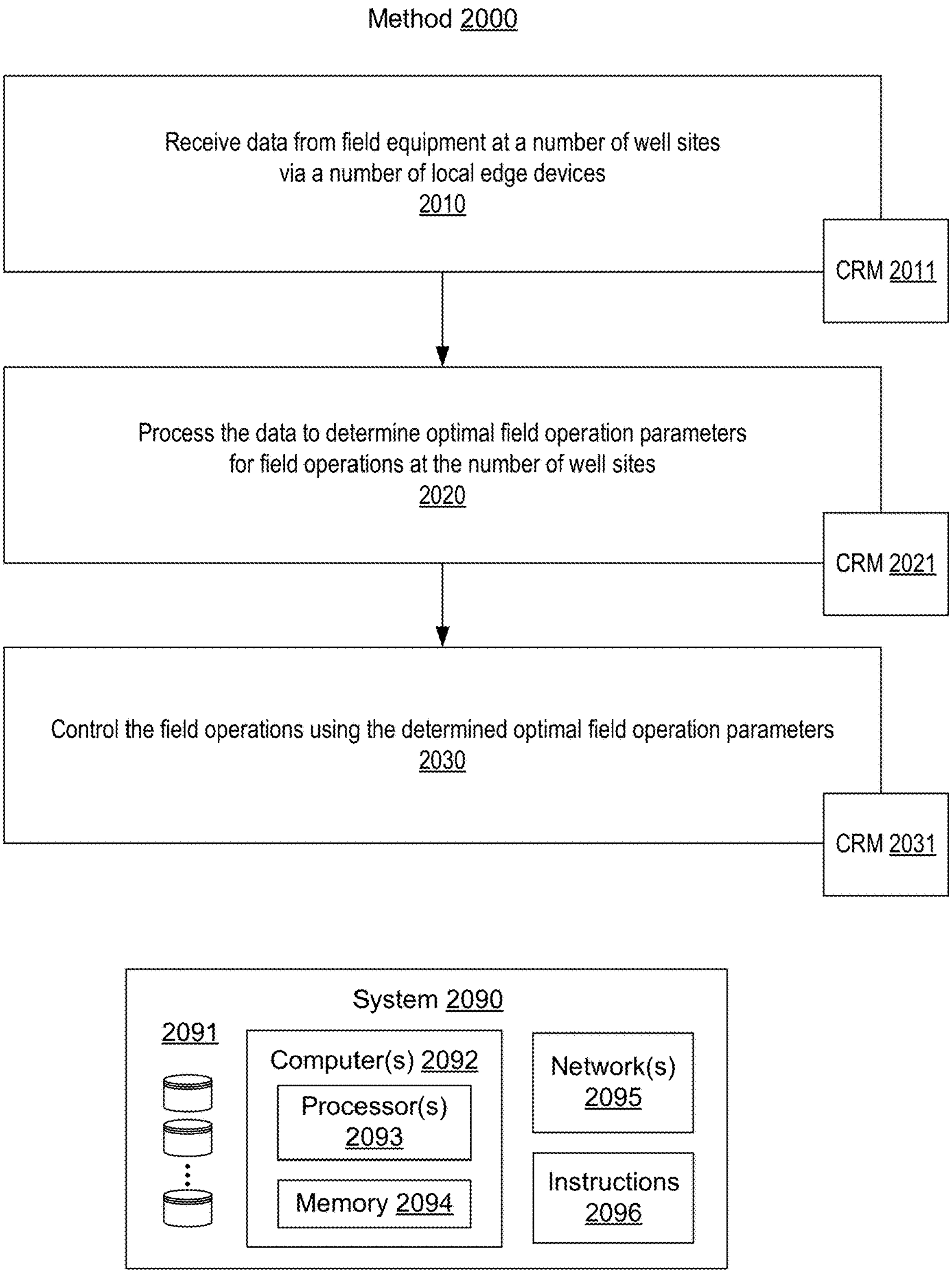
FIG. 20 illustrates an example of a method and an example of a system.

FIG. 20 shows an example of a method 2000 and an example of a system 2090. As shown, the method 2000 can include a reception block 2010 for receiving data from field equipment at a number of well sites via a number of local edge devices; a process block 2020 for processing the data to determine optimal field operation parameters for field operations at the number of well sites; and a control block 2030 for controlling the field operations using the determined optimal field operation parameters.

The method 2000 is shown in FIG. 20 in association with various computer-readable media (CRM) blocks 2011, 2021, and 2031. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 2000. As an example, a computer-readable medium (CRM) may be a computer-readable storage medium that is non-transitory and that is not a carrier wave. As an example, one or more of the blocks 2011, 2021, and 2031 may be in the form of processor-executable instructions.

In the example of FIG. 20, the system 2090 includes one or more information storage devices 2091, one or more computers 2092, one or more networks 2095 and instructions 2096. As to the one or more computers 2092, each computer may include one or more processors (e.g., or processing cores) 2093 and memory 2094 for storing the instructions 2096, for example, executable by at least one of the one or more processors 2093 (see, e.g., the blocks 2011, 2021, and 2031). As an example, a computer may include one or more network interfaces (e.g., wired or wireless), one or more graphics cards, a display interface (e.g., wired or wireless), etc.

As an example, a method may include receiving data from field equipment at a number of well sites via a number of local edge devices; processing the data to determine optimal field operation parameters for field operations at the number of well sites; and controlling the field operations using the determined optimal field operation parameters. In such an example, the field equipment may include artificial lift equipment, for example, consider artificial lift equipment that includes electric submersible pumps.

As an example, determined optimal field operation parameters may be related to greenhouse gas emissions. In such an example, a method may include controlling that reduces greenhouse gas emissions associated with fluid production from a number of well sites.

As an example, processing may include determining an amount of fuel saved by reducing vehicle travel to a number of well sites.

As an example, field equipment may include different brands of field equipment. In such an example, a number of local edge devices may operate to harmonize output of the different brands of field equipment.

As an example, determined optimal field operation parameters may be related to gas lift. In such an example, controlling may control gas lift at a number of well sites.

As an example, controlling may implement closed loop control, which may be local and/or remote.

As an example, a method may include determining parameters in a manner that includes utilizing one or more trained machine learning models, which may include, for example, one or more trained machine learning models embedded in one or more of a number of local edge devices.

As an example, a method may be automated where controlling occurs automatically responsive to processing of received data.

As an example, a method may include, based on controlling, dynamically generating carbon footprint estimates for operation of the number of well sites. In such an example, dynamically generating carbon footprint estimates may include receiving travel-related data from a vehicle management system. In such an example, a method may include, based on travel-related data, planning one or more vehicle trips to one or more of a number of well sites. In such an example, a method may include controlling a vehicle utilized for at least one of the one or more vehicle trips in real-time and transmitting sensor data acquired by one or more sensors of the vehicle, where, for example, the method may include dynamically generating carbon footprint estimates based on at least a portion of the sensor data. As an example, a vehicle may include one or more features of a self-driving vehicle. For example, consider a self-driving vehicle that may include features for human control, human intervention, etc., of one or more automated driving features.

As an example, a method may include implementing local edge devices at a number of well site where the local edge devices are operatively coupled to one or more of a cellular interface and a satellite interface for transmissions to resources of a cloud platform, where the resources of the cloud platform may provide for execution of a control and emissions framework for performance of processing for generation of control instructions to be issued to one or more of the local edge device, and for, based on controlling equipment via the control instructions, dynamically generating carbon footprint estimates for operation of a number of well sites. For example, such a method may provide for dynamically estimating emissions (e.g., GHG emissions), a carbon footprint, etc., for a field in a dynamic manner where, for example, data from the field may be received in real-time or near real-time, directly or indirectly, where such data may provide for increasing accuracy of the estimating.

As explained, a method may include implementing one or more machine learning models, which may be utilized for predictions, classifications, etc. As an example, a model may be trained or re-trained responsive to receipt of data. As explained, data may include travel-related data that may provide for characterizing vehicle trips, whether taken or not taken, for example, with respect to emissions, carbon footprint, etc. As explained, planning, control, etc., may be improved using travel-related data, one or more machine learning models, etc. In such an example, an improvement may be a reduction in emissions (e.g., GHG emissions), a reduction in a carbon footprint, etc.

As an example, a system may include a processor; a memory operatively coupled to the processor; processor-executable instructions stored in the memory and executable to instruct the system to: receive data from field equipment at a number of well sites via a number of local edge devices; process the data to determine optimal field operation parameters for field operations at the number of well sites; and control the field operations using the determined optimal field operation parameters.

As an example, one or more computer-readable storage media may include processor-executable instructions executable by a system to instruct the system to: receive data from field equipment at a number of well sites via a number of local edge devices; process the data to determine optimal field operation parameters for field operations at the number of well sites; and control the field operations using the determined optimal field operation parameters.

As an example, a computer program product can include one or more computer-readable storage media that can include processor-executable instructions to instruct a computing system to perform one or more methods and/or one or more portions of a method.

Figure 21:
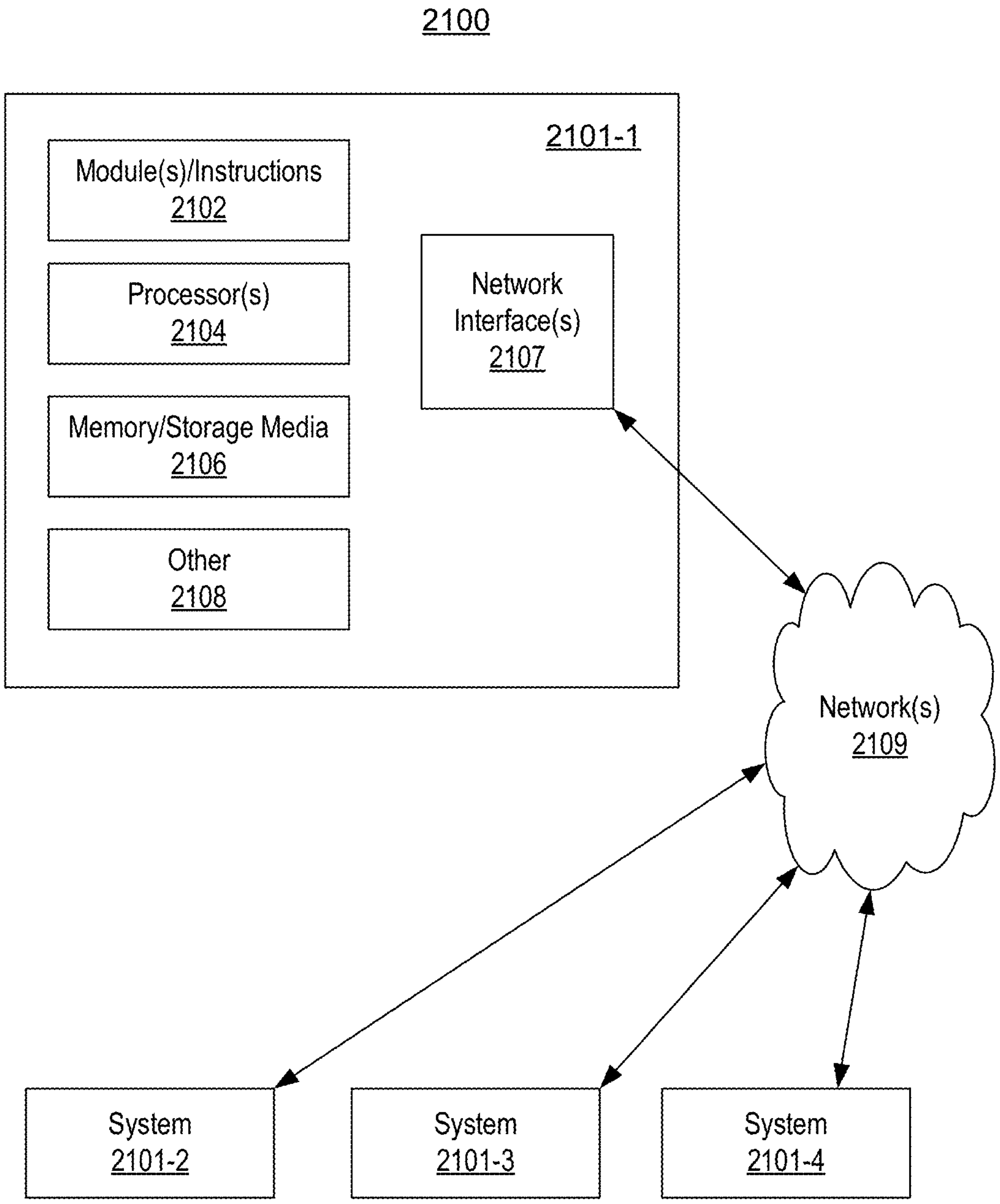
FIG. 21 illustrates example components of a system and a networked system.

In some embodiments, a method or methods may be executed by a computing system. FIG. 21 shows an example of a system 2100 that can include one or more computing systems 2101-1, 2101-2, 2101-3 and 2101-4, which may be operatively coupled via one or more networks 2109, which may include wired and/or wireless networks.

As an example, a system can include an individual computer system or an arrangement of distributed computer systems. In the example of FIG. 21, the computer system 2101-1 can include one or more modules 2102, which may be or include processor-executable instructions, for example, executable to perform various tasks (e.g., receiving information, requesting information, processing information, simulation, outputting information, etc.).

As an example, a module may be executed independently, or in coordination with, one or more processors 2104, which is (or are) operatively coupled to one or more storage media 2106 (e.g., via wire, wirelessly, etc.). As an example, one or more of the one or more processors 2104 can be operatively coupled to at least one of one or more network interfaces 2107; noting that one or more other components 2108 may also be included. In such an example, the computer system 2101-1 can transmit and/or receive information, for example, via the one or more networks 2109 (e.g., consider one or more of the Internet, a private network, a cellular network, a satellite network, etc.).

As an example, the computer system 2101-1 may receive from and/or transmit information to one or more other devices, which may be or include, for example, one or more of the computer systems 2101-2, etc. A device may be located in a physical location that differs from that of the computer system 2101-1. As an example, a location may be, for example, a processing facility location, a data center location (e.g., server farm, etc.), a rig location, a well site location, a downhole location, etc.

As an example, a processor may be or include a microprocessor, microcontroller, processor module or subsystem, programmable integrated circuit, programmable gate array, or another control or computing device.

As an example, the storage media 2106 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution. As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general-purpose processors or application specific chips (e.g., or chipsets), such as ASICs, FPGAs, PLDs, or other appropriate devices.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

Bibliography (documents incorporated by reference herein in their entirety)

1. Carbon Footprint Reduction through the Use of Drones for Inspection Activities | ADIPEC, Abu Dhabi, UAE, October 2022 | Paper Number: SPE-210836-MS
2. Carbon Footprint Management Using Blockchain | ADIPEC, Abu Dhabi, UAE, October 2022 | Paper Number: SPE-210930-MS
3. Assess Digital Maturity to Set Digital Transformation Strategy in Oil and Gas | ADIPEC, Abu Dhabi, UAE, October 2022 | Paper Number: SPE-210930-MS
4. Transforming Legacy Production Operations into Smart Asset Operations in Ecuador. Paper presented at the ADIPEC, 31 Oct.-3 Nov. 2022. SPE-211844-MS
5. A Digital Transformation Journey for a Mature using Production Technologies and Innovation Principles. Papers presented at the ADIPEC, 31 Oct.-3 Nov. 2022. SPE-211796-MS
6. Smart Production Operations in a Remote Field in Latin America | ADIPEC, Abu Dhabi, UAE, October 2022 | Paper Number: SPE-216827-MS

What is claimed is:

1. A method, comprising:

receiving, at a plurality of local edge devices located at respective well sites, real-time operational data from field equipment including artificial lift equipment and a landing pad, at least one of the plurality of local edge devices comprising a mobile gateway included in a drone configured to take off and land to operatively couple the mobile gateway to the artificial lift equipment and the landing pad, each of the respective well sites comprising a wellhead comprising the landing pad and one or more sensors comprising at least one of: a temperature sensor and a pressure sensor;

processing, by one or more trained machine-learning models embedded in at least one of the local edge devices, the real-time operational data to determine optimal field operation parameters comprising gas-lift control parameters for the artificial lift equipment;

automatically controlling, in a closed-loop manner, the artificial lift equipment at the well sites using the determined optimal field operation parameters, the closed-loop controlling being performed locally by the local edge devices at the well sites to reduce communication latency, the closed-loop controlling comprising, via the mobile gateway:

generating fluid flow values using information from the one or more sensors; and issuing one or more control instructions to the artificial lift equipment based on the fluid flow values;

dynamically generating, based on the automatic controlling, carbon footprint estimates for operation of the well sites, wherein the dynamically generating the carbon footprint estimates comprises receiving travel-related data from a vehicle management system;

planning, based on the travel-related data, one or more vehicle trips to one or more of the well sites;

controlling a vehicle utilized for at least one of the one or more vehicle trips in real-time; and transmitting sensor data acquired by one or more sensors of the vehicle, wherein the dynamically generating the carbon footprint estimates is based on at least a portion of the sensor data.

2. The method of claim 1, wherein the determined optimal field operation parameters are related to greenhouse gas emissions.

3. The method of claim 2, wherein the controlling reduces greenhouse gas emissions associated with fluid production from the well sites.

4. The method of claim 1, wherein the field equipment comprises different brands of field equipment.

5. The method of claim 4, wherein the plurality of local edge devices operate to harmonize output of the different brands of field equipment.

6. The method of claim 1, wherein the artificial lift equipment comprises one or more electric submersible pumps.

7. The method of claim 1, wherein the processing comprises determining an amount of fuel saved by reducing vehicle travel to the one or more well sites.

8. The method of claim 1, wherein:

the local edge devices are operatively coupled to one or more of a cellular interface or a satellite interface for transmissions to resources of a cloud platform; and the resources of the cloud platform execute a control and emissions framework for:

performance of the processing; and based on the controlling, dynamically generating carbon footprint estimates for operation of the well sites.

9. The method of claim 1, wherein at least one of the plurality of local edge devices comprises at least one of: a switching capability or a communication capability for information transmission between equipment.

10. The method of claim 1, wherein at least one of the plurality of local edge devices comprises a gateway deployed as a locally-powered box configured to communicate locally with other equipment via one or more interfaces.

11. The method of claim 1, wherein at least one of the plurality of local edge devices comprises a trusted platform module (TPM) that provides secure and measured boot support.

12. The method of claim 1, wherein:

at least one of the plurality of local edge devices comprises a motion detection camera configured to detect a presence of an object; and at least one of an image of the object or an image recognition signal is transmitted via a satellite communication link such that a risk is assessed at a site remote from the gateway.

13. The method of claim 1, further comprising wirelessly connecting a gas skid to a gateway that:

collects information from electro-submersible pumping equipment and wireless sensors; and instructs the gas skid to calibrate a valve response for one or more of smooth, automatic, or controlled valve operation of the gas skid for gas handling.

14. A system, comprising:

one or more processors;

a memory operatively coupled to at least one of the one or more processors; and processor-executable instructions stored in the memory and executable to instruct the system to:

receive, at a plurality of local edge devices located at respective well sites, real-time operational data from field equipment including artificial lift equipment and a landing pad, at least one of the plurality of local edge devices comprising a mobile gateway included in a drone configured to take off and land to operatively couple the mobile gateway to the artificial lift equipment and the landing pad, each of the respective well sites comprising a wellhead comprising the landing pad and one or more sensors comprising at least one of: a temperature sensor and a pressure sensor;

process, by one or more trained machine-learning models embedded in at least one of the local edge devices, the real-time operational data to determine optimal field operation parameters comprising gas-lift control parameters for the artificial lift equipment;

automatically control, in a closed-loop manner, the artificial lift equipment at the well sites using the determined optimal field operation parameters, the closed-loop controlling being performed locally by the local edge devices at the well sites to reduce communication latency, the closed-loop controlling comprising, via the mobile gateway:

generating fluid flow values using information from the one or more sensors; and issuing one or more control instructions to the artificial lift equipment based on the fluid flow values;

dynamically generate, based on the automatic controlling, carbon footprint estimates for operation of the well sites, wherein the dynamically generating the carbon footprint estimates comprises receiving travel-related data from a vehicle management system;

plan, based on the travel-related data, one or more vehicle trips to one or more of the well sites;

control a vehicle utilized for at least one of the one or more vehicle trips in real-time; and transmit sensor data acquired by one or more sensors of the vehicle, wherein the dynamically generating the carbon footprint estimates is based on at least a portion of the sensor data.

15. One or more non-transitory computer-readable storage media comprising processor-executable instructions executable by one or more processors to instruct the one or more processors to:

receive, at a plurality of local edge devices each comprising at least one of the one or more processors located at respective well sites, real-time operational data from field equipment comprising: artificial lift equipment and a landing pad, at least one of the plurality of local edge devices comprising a mobile gateway included in a drone configured to take off and land to operatively couple the mobile gateway to the artificial lift equipment and the landing pad, each of the respective well sites comprising a wellhead comprising the landing pad and one or more sensors comprising at least one of: a temperature sensor and a pressure sensor; and a variable speed drive (VSD) comprising a machine learning processing component operatively coupled to one or more of: sensor or data acquisition components;

process, by one or more trained machine-learning models embedded in at least one of the local edge devices, the real-time operational data to determine optimal field operation parameters comprising gas-lift control parameters for the artificial lift equipment;

automatically control, in a closed-loop manner, the artificial lift equipment at the well sites-using the determined optimal field operation parameters, the closed-loop controlling being performed locally by the local edge devices at the well sites to reduce communication latency, the closed-loop controlling comprising, via the mobile gateway:

generating fluid flow values using information from the one or more sensors;

issuing one or more control instructions to the artificial lift equipment based on the fluid flow values; and VSD controlling to control one or more electric motors of a pump or pumps of the field equipment based on information from the one or more of: the sensor or the data acquisition components;

dynamically generate, based on the automatic controlling, carbon footprint estimates for operation of the well sites, wherein the dynamically generating the carbon footprint estimates comprises receiving travel-related data from a vehicle management system; and plan, based on the travel-related data, one or more vehicle trips to one or more of the well sites.

* * * * *